US010109971B2

(12) United States Patent
Lefavour et al.

(10) Patent No.: US 10,109,971 B2
(45) Date of Patent: Oct. 23, 2018

(54) PORTABLE DIELESS HAND HELD POWER TOOLS

(71) Applicant: Hubbell Incorporated, Shelton, CT (US)

(72) Inventors: John David Lefavour, Litchfield, NH (US); Thomas Romeo Faucher, Manchester, NH (US); Lawrence Brown, Allenstown, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/429,869

(22) Filed: Feb. 10, 2017

(65) Prior Publication Data

US 2017/0302044 A1    Oct. 19, 2017

Related U.S. Application Data

(60) Provisional application No. 62/322,485, filed on Apr. 14, 2016.

(51) Int. Cl.
| | |
|---|---|
| *B21J 9/14* | (2006.01) |
| *H01R 43/042* | (2006.01) |
| *B21D 37/10* | (2006.01) |
| *B23P 11/00* | (2006.01) |
| *B25F 1/00* | (2006.01) |

(52) U.S. Cl.
CPC ......... *H01R 43/0428* (2013.01); *B21D 37/10* (2013.01); *B23P 11/005* (2013.01); *B25F 1/00* (2013.01); *H01R 43/042* (2013.01)

(58) Field of Classification Search
CPC . H01R 43/0428; H01R 43/042; B23P 11/005; B21D 37/10; B25F 1/00

USPC .................................................... 72/453.16
See application file for complete search history.

(56) References Cited

U.S. PATENT DOCUMENTS

| | | | | |
|---|---|---|---|---|
| 3,644,989 | A | * | 2/1972 | Morby ................ H01R 4/206 174/84 C |
| 3,862,482 | A | | 1/1975 | Green |
| 4,136,549 | A | | 1/1979 | Lytle et al. |
| 4,604,890 | A | | 8/1986 | Martin |
| 4,640,117 | A | | 2/1987 | Anderson et al. |
| 5,152,162 | A | | 10/1992 | Ferraro et al. |
| 5,193,379 | A | | 3/1993 | Ferraro |
| D387,961 | S | | 12/1997 | Yasui |
| D404,627 | S | | 1/1999 | Hirabayashi |
| D408,242 | S | | 4/1999 | Yamamoto |

(Continued)

OTHER PUBLICATIONS

International Search Report and Written Opinion mailed in corresponding PCT Application PCT/US2017/027403 dated Aug. 16, 2017.

*Primary Examiner* — David B Jones
(74) *Attorney, Agent, or Firm* — Wissing Miller LLP

(57) ABSTRACT

Portable, hand held, battery operated, dieless, hydraulic crimping tools are provided with a working head and a tool frame. The working head has a head frame with an open access to a working area of the working head. The open access may be in the form of a C-shape. The working head has a nest to receive a crimping member. An indentor is attached to a piston within the tool frame. The piston moves the indentor between a home position adjacent the tool frame and an indenting position where the indentor impacts the crimping member.

37 Claims, 23 Drawing Sheets

(56) References Cited

U.S. PATENT DOCUMENTS

| | | | |
|---|---|---|---|
| 6,101,862 A | * | 8/2000 | Rzasa ................. B25B 27/10 29/751 |
| 6,619,101 B1 | | 9/2003 | Faucher et al. |
| 6,718,870 B1 | | 4/2004 | Frenken |
| 7,124,619 B1 | | 10/2006 | Lefavour et al. |
| 7,363,799 B2 | | 4/2008 | Hamm |
| 7,578,159 B2 | | 8/2009 | Bowles |
| 7,634,859 B2 | | 12/2009 | Amherd |
| 7,908,963 B2 | | 3/2011 | Frenken |
| 8,056,473 B2 | | 11/2011 | Frenken |
| D668,922 S | | 10/2012 | Hyma |
| 8,316,685 B2 | | 11/2012 | Stucki |
| 2007/0295053 A1 | | 12/2007 | Ruland |
| 2008/0282763 A1 | | 11/2008 | Chiasson et al. |
| 2008/0289394 A1 | | 11/2008 | Mitchell |
| 2009/0313820 A1 | | 12/2009 | Roman |
| 2010/0000288 A1 | | 1/2010 | Barezzani et al. |

\* cited by examiner

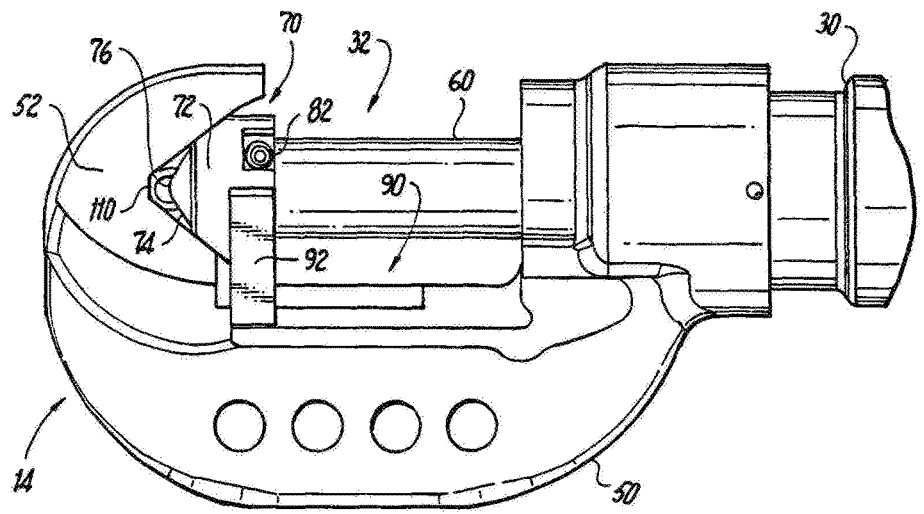
Fig. 2
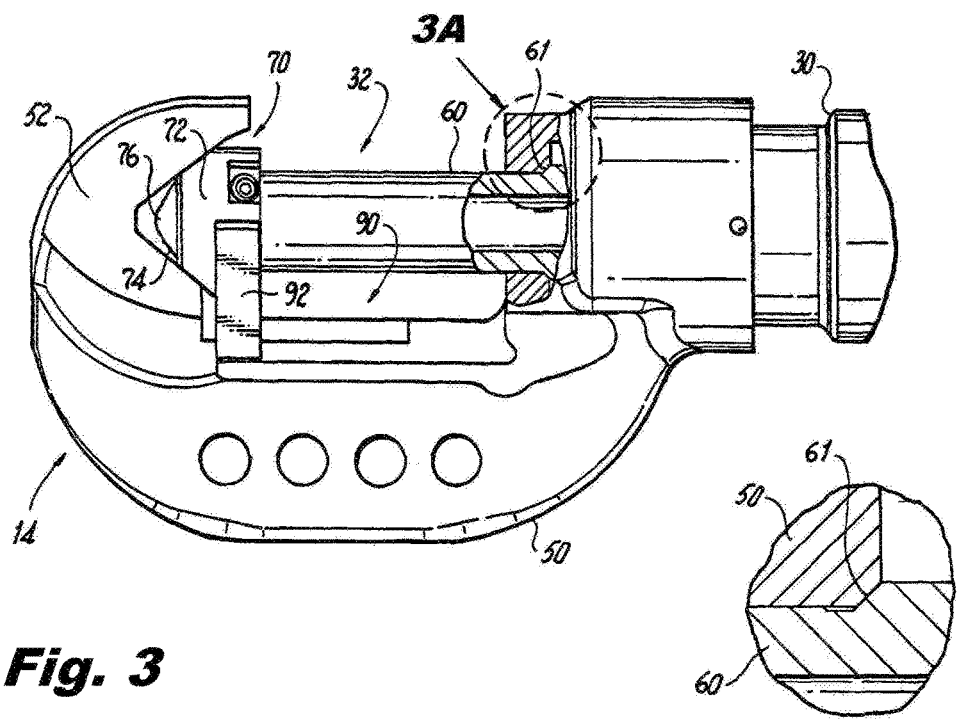
Fig. 3
Fig. 3A

Fig. 6
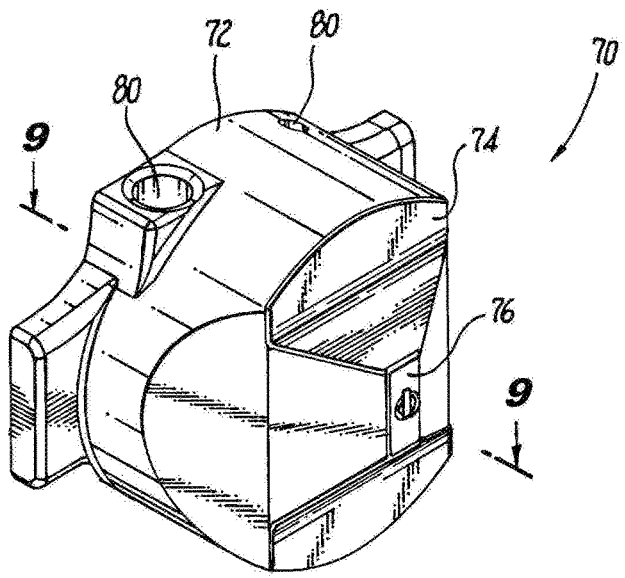
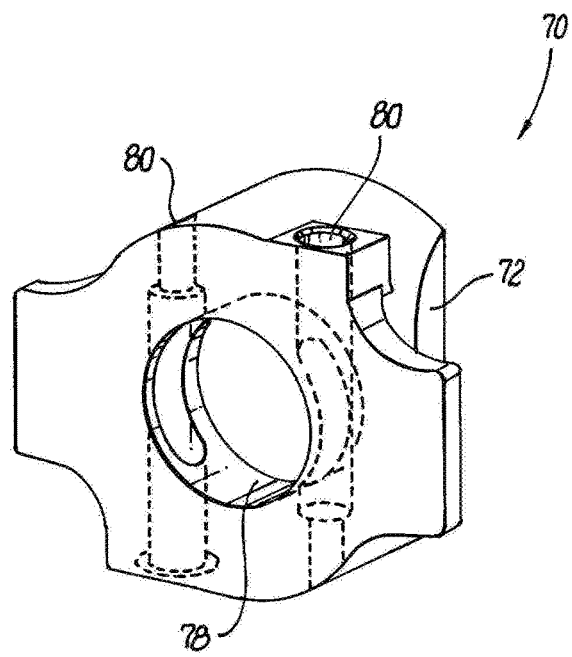
Fig. 7

Fig. 23
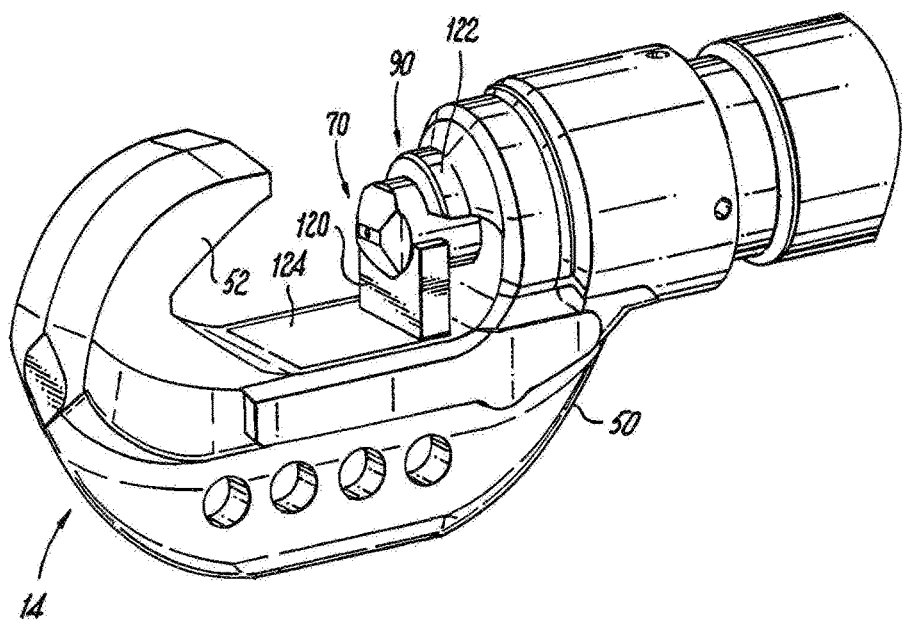
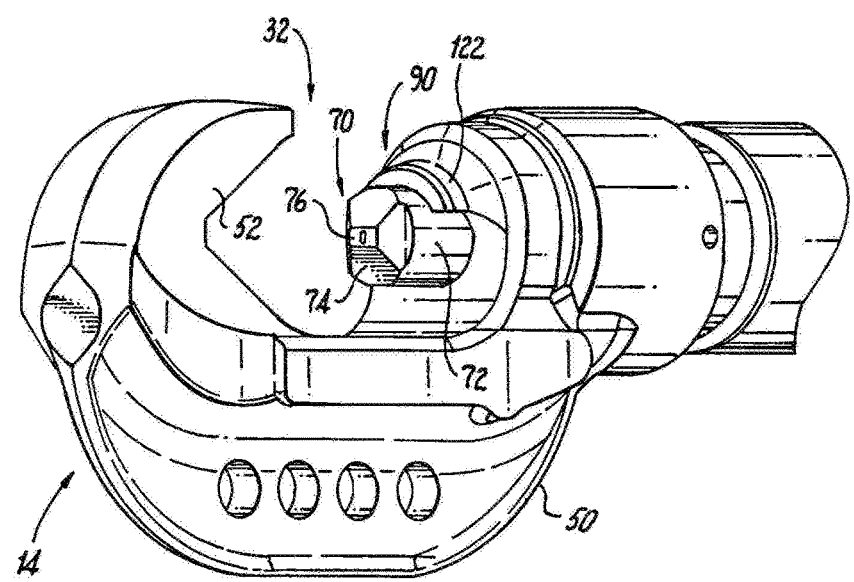
Fig. 24 PORTABLE DIELESS HAND HELD POWER TOOLS

CROSS REFERENCE TO RELATED APPLICATIONS

The present application is based on and claims benefit from U.S. Provisional Application Ser. No. 62/322,485 filed Apr. 14, 2016 entitled "Portable Dieless Hand Held Power Tools", the entire contents of which are herein incorporated by reference.

BACKGROUND

Field

The present disclosure relates to power crimping tools and, more particularly, to dieless, portable, hand-held power crimping tools with a partially open head for easy access to a working area of the head.

Description of the Related Art

Many portable power tools are hand held tools that have electric motors to drive a working head used to perform various tasks, such as crimping, drilling, shaping, fastening, grinding, polishing, heating, etc. There is a segment of the portable tool market that incorporates a hydraulic pump to enable the working head to apply a relatively large amount of force or pressure for a particular task. Such tools may operate with a hydraulic pump actuated by a battery powered electric motor. Battery powered hydraulic power tools are employed in numerous applications to provide an operator with a desired flexibility and mechanical advantage. For example, operators of crimping tools used for making crimping connections, such as crimping large power connectors onto large conductors, may need added force to crimp such large conductors, e.g., #8 conductors and larger, to suitable connectors. Such battery powered hydraulic power tools can come with dies to perform the crimping operation, and other battery powered hydraulic power tools have a dieless crimping operation. With a dieless crimping operation, an indentor is used to impact a wire lug resting within a nest within a working area of the tool head. In such portable dieless power tools, the nest structure is locked to the main body or frame of the tool head to withstand the crimping forces exerted by the tool. Such locking nest structures are not suitable in certain environments, for example, when making connections to or on splices of overhead high tension power lines.

SUMMARY

The present disclosure provides exemplary embodiments of dieless crimping tools. In one embodiment, the dieless crimping tool includes a working head having a head frame, a movable indentor, and an indentor guide assembly. The head frame has open access to a working area of the working head, and a nest within the working area for receiving a crimping member, such as crimps, wire lugs, connectors and couplers. The dieless crimping tool also includes a tool frame having a piston coupled to the indentor that moves the indentor along the indentor guide assembly between a home position adjacent the tool frame and an impacting position adjacent the nest.

In another embodiment, the dieless crimping tool includes a working head and a tool frame. The working head includes an indentor, a head frame and an indentor guide assembly. The head frame has an I-beam structure comprising an upper flange, a lower flange and a web between the upper flange and the lower flange. An open access to a working area of the working head is provided in the I-beam structure. A nest is positioned within the working area for receiving a crimping member. The nest is adjacent at least a portion of the upper flange. The indentor guide assembly is positioned within the working area of the working head adjacent at least a portion of the upper flange. The tool frame has a piston coupled to the indentor that moves the indentor along the indentor guide assembly within the working area of the working head between a home position adjacent the tool frame and an impacting position adjacent the nest.

A dieless crimping tool includes a working head and a tool frame. The working head has a head frame, an indentor and a nest. The head frame has open access to a working area of the working head and the nest is positioned within the working area for receiving a crimping member. The tool frame has a piston coupled to the nest that moves the nest within the working area between a home position adjacent the tool frame and an impacting position adjacent the indentor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 2 is a side elevation view of the working head of FIG. 1, illustrating the indentor in an impacting position engaging a wire lug inserted in a nest;

FIG. 3 is a side elevation view of the working head of FIG. 1, illustrating the indentor in the impacting position, and a stop for preventing further distal movement of the indentor;

FIG. 3A is an enlarged view of the working head of FIG. 3, illustrating the stop engaging the working head for preventing further distal movement of the indentor;

FIG. 6 is a front perspective view of an indentor used in the crimping tool of FIG. 1;

FIG. 7 is a rear perspective view of the indentor of FIG. 6;

FIG. 23 is a front perspective view of another exemplary embodiment of a working head of the crimping tool of FIG. 1, illustrating an upper collar and carriage for guiding movement of the indentor;

FIG. 24 is a front perspective view of another exemplary embodiment of a working head of the crimping tool of FIG. 1, illustrating an upper collar for guiding movement of the indentor;

DETAILED DESCRIPTION

Figure 1:
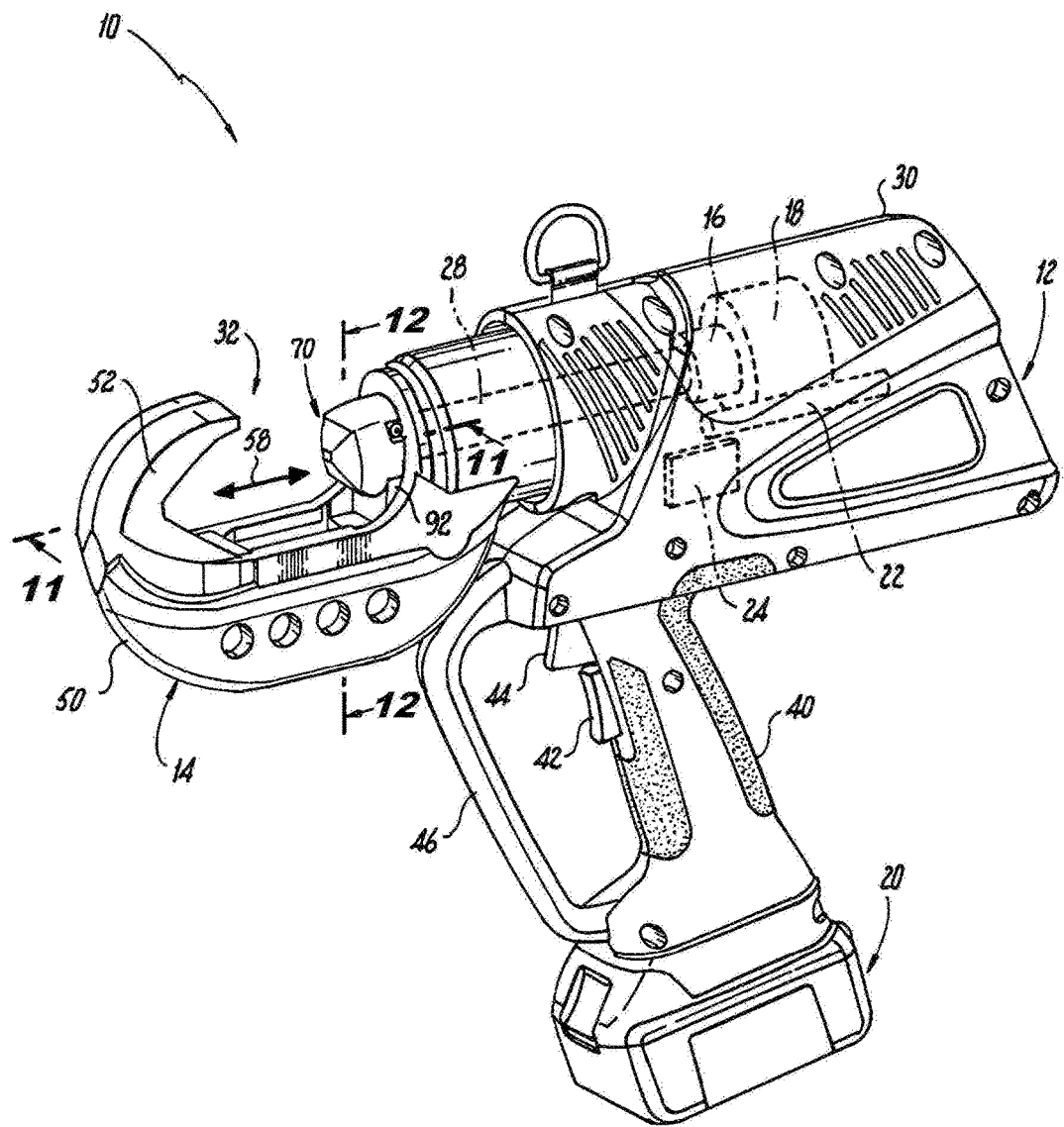
FIG. 1 is a front perspective view of an exemplary embodiment of a crimping tool according to the present disclosure, illustrating a tool frame and a working head of the crimping tool.

Illustrative embodiments of the present disclosure may be provided as improvements to portable, hand held, battery operated, dieless, hydraulic crimping tools. For example, a portable, hand held, battery operated, dieless, hydraulic crimping tool may be provided with a working head having a head frame with an open access path to a working area of the working head. An example of such a working head is a C-shaped working head. For ease of description, the portable, battery operated, dieless, hydraulic crimping tools according to the present disclosure may also be referred to as the "crimping tools" in the plural, and the "crimping tool" in the singular. The features of the crimping tool of the present disclosure could also be used in other types of dieless power tools. In addition, any suitable size, shape or type of elements or materials can be used to form the shape of the tool frame of the crimping tool. The crimping tool is configured to crimp a crimping member. Examples of crimping members include crimps, connectors, wire lugs, couplers and pulling lugs. For ease of description, the crimping members may also be referred to herein as a "wire lug" in the singular and "wire lugs" in the plural.

Referring to FIGS. 1-5, an exemplary embodiment of a crimping tool according to the present disclosure is shown. The crimping tool 10 includes a tool frame 12, a working head 14, a pump 16, a motor 18, a battery 20, a fluid reservoir 22, a controller 24 and a hydraulic drive conduit system 28. The tool frame 12 includes a main body 30 and a handle 40 that form a pistol-like shape. However, the tool frame 12 could be in any suitable type of shape, such as, for example, an in-line shape, seen in FIG. 32, or a suitcase shape, seen in FIG. 33, and described herein below.

The pump 16, motor 18, fluid reservoir 22, controller 24, and hydraulic drive conduit system 28 are located within the main body 30 of the tool frame 12. The crimping tool 10 may also include a camera 26, seen in block form in FIG. 5, mounted to the tool frame 12 and oriented to provide a video of a working area 32 of the working head 14. The crimping tool 10 may also include a tool tracking system 27, seen in block form in FIG. 5, for tracking the location of the tool. In an exemplary embodiment, the tool tracking system 27 may include known GPS tracking components that receive UPS satellite signals and transmits the location of the tool to a remote station allowing a user to track the position of the tool. Such transmissions to remote stations may be achieved using known communication systems, such as for example, cellphone networks.

The battery 20 is removably connected to the bottom of the handle 40. In another embodiment, the battery 20 could be removably mounted or connected to any suitable position on the tool frame 12. In another embodiment, the battery 20 may be affixed to the crimping tool 10 so that it is not removable. The battery 20 is preferably a rechargeable battery, such as a lithium ion battery, that can output a voltage of at least 16 VDC, and preferably in the range of between about 16 VDC and about 24 VDC. In the exemplary embodiment shown in FIG. 1, the battery 20 can output a voltage of about 18 VDC.

Figure 5:
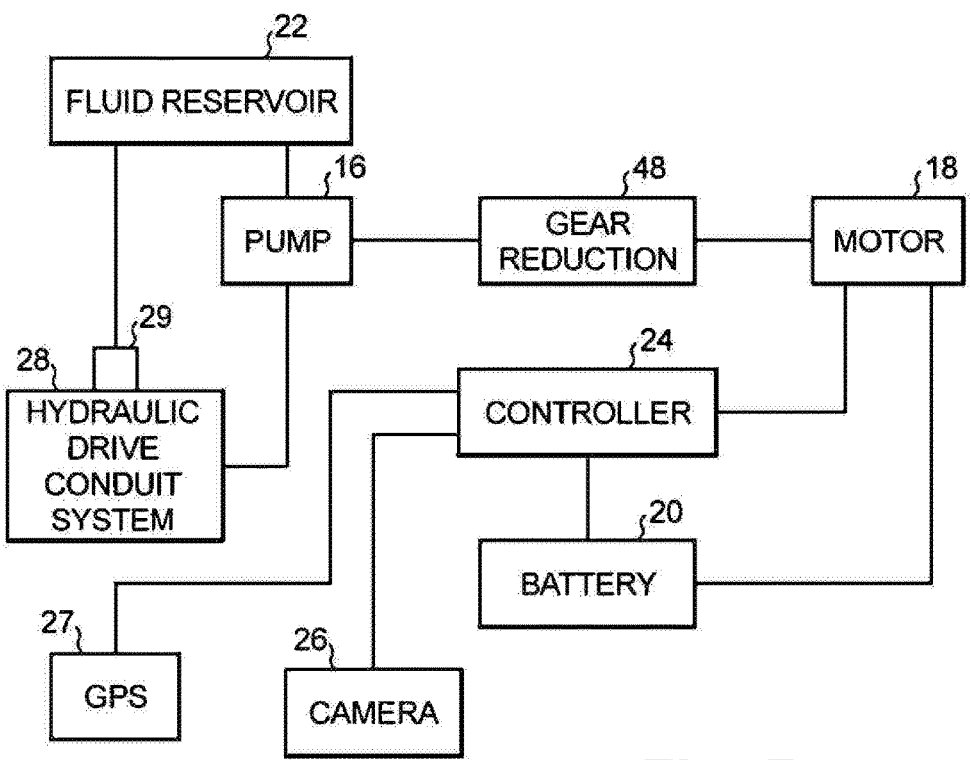
FIG. 5 is an exemplary block diagram for describing various parts of the crimping tool shown in FIG. 1.

Referring to FIGS. 1 and 5, the motor 18 is coupled to the battery 20 and the controller 24, and its operation is controlled by the controller 24. Generally, the motor 18 is adapted to operate at a nominal voltage corresponding to the voltage of the battery 20, e.g., between about 16 VDC and about 24 VDC. For example, if the battery 20 is adapted to output a voltage of about 18 VDC, then the motor 18 would be adapted to operate at a voltage of about 18 VDC. Under a no-load condition, such a motor 18 can operate at about 19,500 rpm with a current of about 2.7 amps. At maximum efficiency, the motor 18 can operate at about 17,040 rpm with a current of about 18.7 amps, a torque of about 153 mN-m (1560 g-cm), and an output of about 273 W. An example of such an 18 VDC motor 18 is the RS-775WC-8514 motor, manufactured by Mabuchi Motor Co., Ltd. of Chiba-ken, Japan. However, as noted above, any suitable type of motor adapted to operate above a 16 VDC nominal voltage could be used. For example, the motor may be a RS-775VC-8015 motor, also manufactured by Mabuchi Motor Co., Ltd., which has a nominal operating voltage of about 16.8 VDC. As another example, the motor may be a motor adapted to operate at a 24 VDC nominal voltage. The output shaft of the motor 18 is connected to the pump 16 by a gear reduction assembly or gearbox 48, shown in block form in FIG. 5. Any suitable type of gear reduction assembly 48 could be used.

The handle 40 includes one or more operator controls, such as trigger switches 42 and 44, which can be manually activated by an operator. The handle 40 of the tool frame 12 may include a hand guard 46 to protect an operators hand while operating the crimping tool 10 and to prevent unintended operation of trigger switches 42 and 44. According to an embodiment of the present disclosure, one of the trigger switches (e.g., trigger switch 42) may be used to activate the piston 60 to move the indentor 70 towards the impacting position. The other trigger switch (e.g., trigger switch 44) may be used to retract the piston 60 to the home position, shown in FIG. 1. The operator controls, e.g., trigger switches 42 and 44, are operably coupled to the controller 24.

The crimping tool 10 may include a poppet valve 29, seen in block form in FIG. 5, connected to the hydraulic drive conduit system 28. The poppet valve 29 is adapted to open when the conduit system 28 reaches a predetermined hydraulic pressure threshold, such as between about 8,000 psi and about 11,000 psi. When the poppet valve opens, hydraulic fluid being pumped by the pump 16 can exit the conduit system 28 and return to the fluid reservoir 22. The poppet valve 29 can be adapted to generate an audible sound when it opens. This audible sound can signal to the operator that the crimping tool 10 has reached its maximum predetermined hydraulic pressure and, thus, the action of the working head 14, e.g., crimping action, is completed.

In the exemplary embodiment shown in FIG. 5, the controller 24 is adapted to sense a current drop of electricity to the motor 18. When the poppet valve 29 opens, resistance to rotation of the motor 18 is reduced such that the motor draws less current. The controller 24 senses this current drop via a current sensor (not shown), and automatically deactivates the motor 18 for a predetermined period of time. In one embodiment, the predetermined period of time is between about 2 seconds and about 3 seconds. However, any suitable predetermined period of time could be set. In another embodiment, the controller 24 could be adapted to deactivate the motor 18 until a reset button or reset like procedure is performed by the operator. With this type of system, an operator can sense via tactile feedback that the motor 18 and pump 16 have stopped and would not need to rely on an audible signal being heard or a visual signal from an LED positioned on the crimping tool 10.

As shown in FIG. 1, the working head 14 includes a head frame 50 and an indentor 70, which will be described in more detail below. The head frame 50 may be connected to the front end of the tool frame 12 and fixed or locked in position. In another embodiment, the head frame 50 may be rotatably connected to the tool frame 12.

Referring to FIGS. 1 and 2, the head frame 50 of the working head 14 includes a nest 52 that is configured to receive a wire lug 110 for subsequent crimping by the indentor 70. The nest 52 can come in any number of embodiments. For example, in the exemplary embodiment shown the nest 52 is a V-nest. The shape of the nest is preferably matched to the shape of the indentor 70 so that the indentor is not generally prohibited from impacting a wire lug 110 resting within the nest 52. Typically, this is not an issue with larger wire lugs that occupy a larger area within the nest 52 such that the indentor may not contact the nest 52. However, there may be instances where the wire lug is sufficiently small so that a front face 74 of the indentor 70 contacts one or more walls of the nest 52. In such instances it may be desirable to have the front face 74 of the indentor 70 contact one or more walls of the nest 52 as a way to minimize the force applied to the crimping of small wire lugs. In such cases, the walls of the nest 52 would absorb a portion of the force exerted by the indentor 70, and the remaining force would be used by an impacting surface 76 of the indentor to crimp a wire into the wire lug. In addition, as shown in FIG. 3, a piston 60 may include a stop 61 that contacts the head frame 50 to further limit the force applied by the indentor 70 when in the impacting position.

The indentor 70 is movably connected to the head frame 50 using a guide track assembly 90. In such embodiments, the indentor 70 is releasably coupled to a piston 60, seen in FIG. 4, which is part of the hydraulic drive conduit system 28. The piston, when activated, moves the indentor 70 between an impacting position where the indentor impacts a wire lug, as seen in FIG. 2, and a home position (or at rest position) where the piston is retracted towards the tool frame 12, as seen in FIG. 1. In the exemplary embodiment shown in FIG. 4, the distal end 60a of the piston 60 includes a slot 64 on each side of the piston 60. The slots 64 are used to engage pins passed through the indentor 70 to releasably secure the indentor to the piston 60. In another exemplary embodiment shown in FIG. 4A, the distal end 60a of the piston 60 includes a radial channel 66 used to engage pins passed through the indentor 70 to releasably secure the indentor to the piston 60, and to permit the piston to rotate independent of the indentor 70 so that rotation of the piston is not translated to rotation of the indentor.

Figure 4:
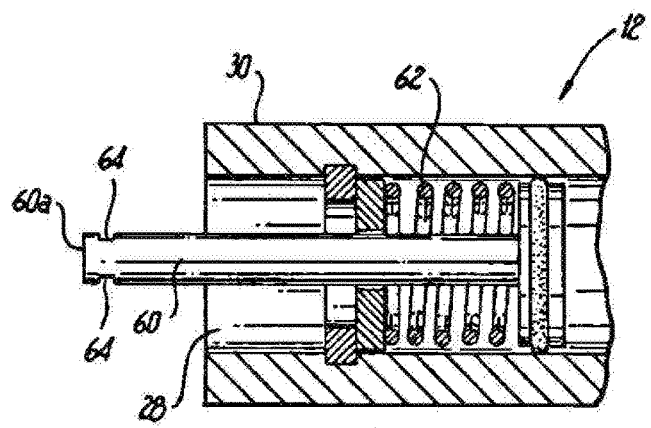
FIG. 4 is a cross-sectional view of an exemplary embodiment of a distal end of the tool frame of FIG. 1, illustrating an exemplary embodiment for a piston extending from the distal end of the tool frame.
Figure 4A:
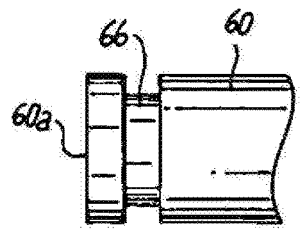
FIG. 4A is an enlarged side view of another exemplary embodiment of the distal end of the piston of FIG. 4.

The indentor 70 is adapted to move between the home position and the impacting position in conjunction with an indentor guide assembly 90, as indicated by arrow 58 in FIG. 1. The hydraulic drive conduit system 28, including the piston 60, is connected between the pump 16 and the body of the indentor 70. Hydraulic fluid pumped by the pump 16 through the hydraulic drive conduit system 28 and against a proximal end of the piston 60, which is releasably couple to the indentor 70, causes the indentor to move toward a distal end of the working head 14, i.e., toward the impacting position. As shown in FIG. 4, the tool frame 12 of the crimping tool 10 preferably includes a spring 62 which is adapted, as is known in the art, to return the piston 60 to the home position when hydraulic fluid pressure is removed from the proximal end of the piston 60. In the exemplary embodiment shown, the piston 60 has a diameter of about 1 inch. However, the diameter of the piston could have any suitable size or shape for functioning as a hydraulic fluid contact surface. For example, the piston may have a diameter that is substantially the same size as the indentor body.

Referring now to FIGS. 6-11, the indentor 70 will be described in more detail. The indentor 70 is used to impact a wire lug, connector or coupler positioned or resting within the nest 52 of the head frame 50. To perform this operation, the indentor 70 is preferably a solid member, made of steel or other hard material capable of withstanding continuous impacts against wire lugs under the forces exerted by the piston 60. The indentor 70, according to this exemplary embodiment, has a body 72, a front face 74 extending from the body, and an impact surface 76 extending from the front face 74. The front face 74 and impact surface 76 are preferably configured to fit within a portion of the nest 52 of the head frame 50. The impact surface 76 is used to impact a wire lug resting within the nest 52.

Figure 8:
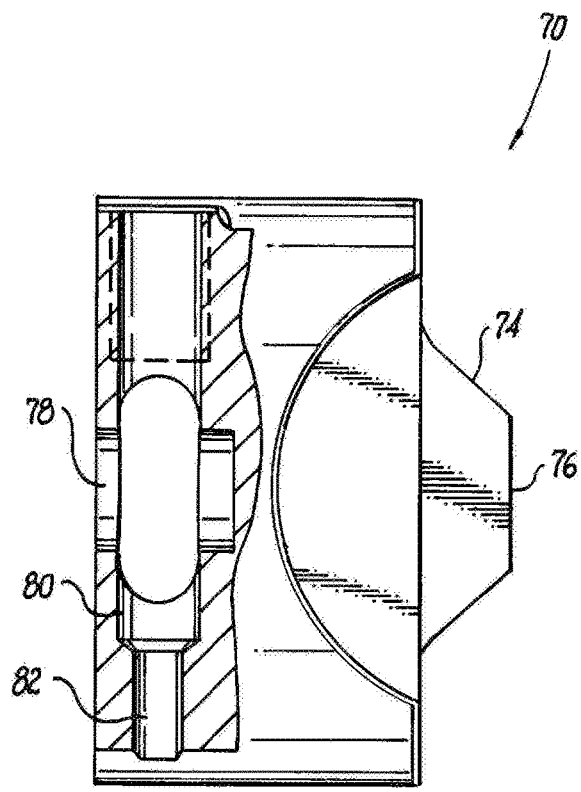
FIG. 8 is a side view in partial cross-section of the indentor of FIG. 6.
Figure 9:
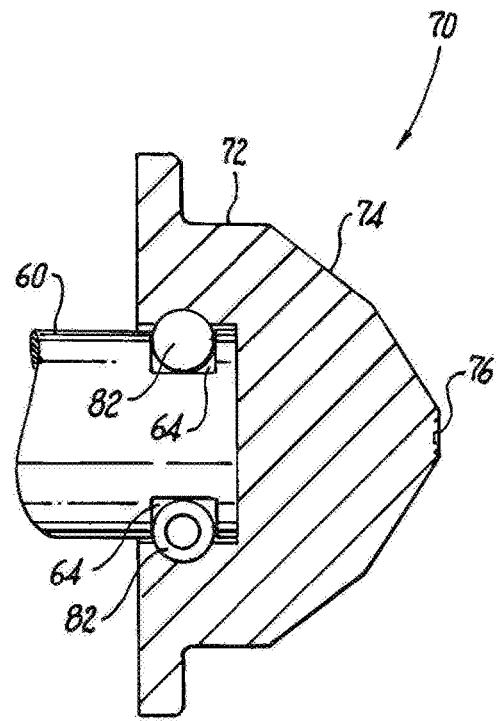
FIG. 9 is a cross-section view of the indentor of FIG. 6 taken along line 9-9.
Figure 10:
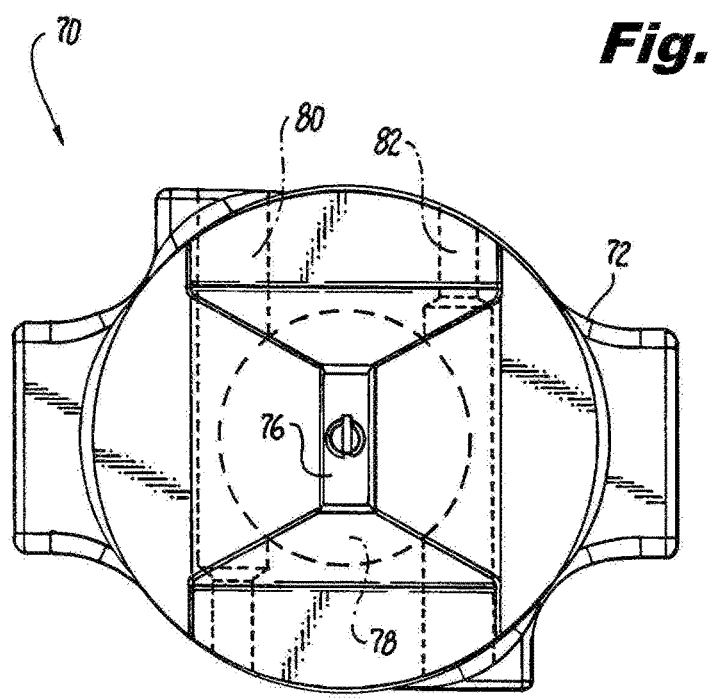
FIG. 10 is a front plan view of the indentor of FIG. 6.
Figure 11:
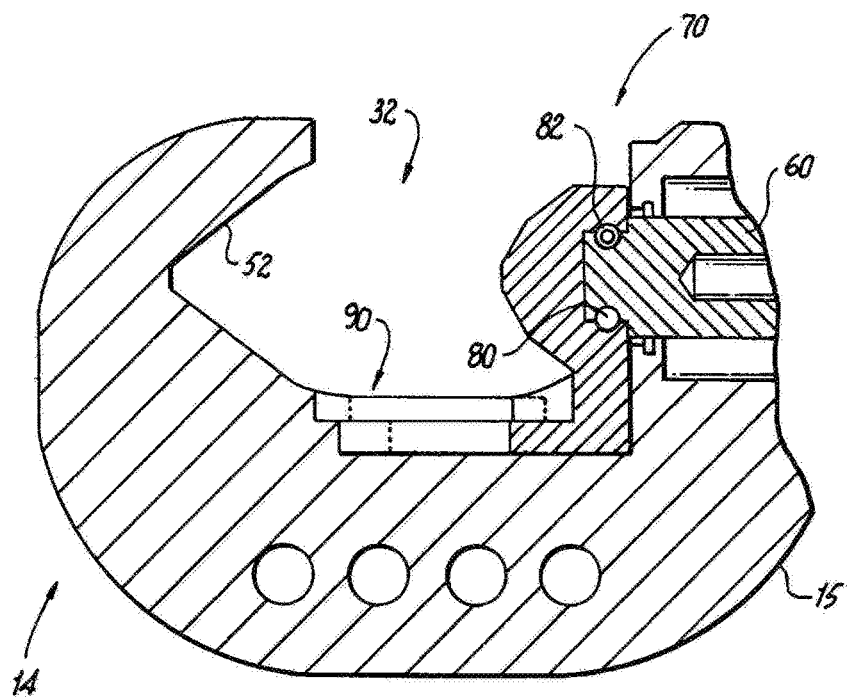
FIG. 11 is a cross-sectional view of the working head of the crimping tool of FIG. 1 taken along line 11-11, and illustrating the fixed nest and the indentor coupled to an exemplary embodiment of an indentor guide assembly.

As noted above, in the embodiment of FIG. 1, the indentor 70 is releasably coupled to the piston 60. One exemplary embodiment for releasably coupling the indentor to the piston is shown in FIGS. 6-11. In this exemplary embodiment, the body 72 of the indentor 70 includes a piston aperture 78, seen in FIGS. 7 and 8, for receiving the distal end of the piston 60. The body 72 includes one or more pin apertures 80 that at least partially pass through the piston aperture 78, as shown in FIGS. 7 and 8. When the piston 60 is positioned within the piston aperture 78, one or more dowel pins 82, seen in FIGS. 8 and 9, are inserted in to the pin apertures 80 so that each pin is at least partially positioned within a slot 64 in the distal end of the piston 60, as seen in FIGS. 9 and 11. In another exemplary embodiment, the distal end 60a of the piston 60 may include the radial channel 66, shown in FIG. 4A, so that when the indentor 70 is releasably coupled to the piston 60, the piston is able to rotate independent of the indentor as described above.

Figure 12:
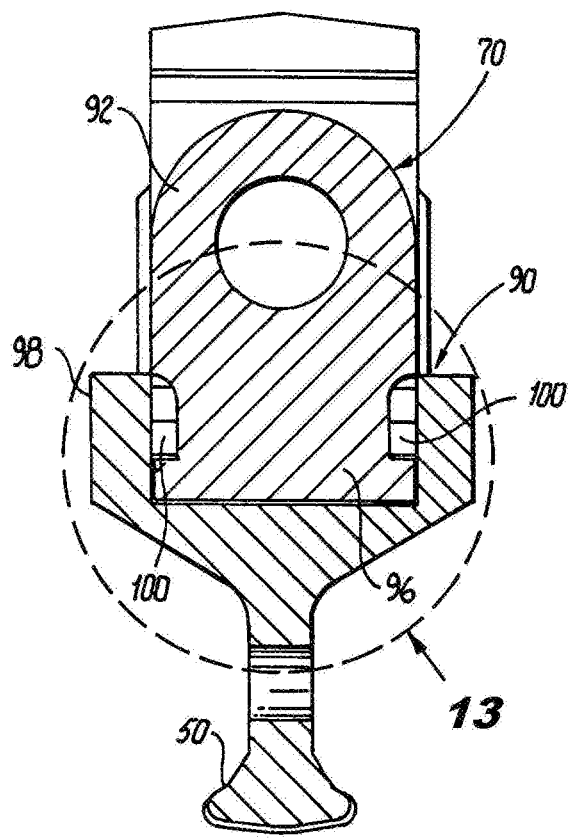
FIG. 12 is a cross-sectional view of the working head of FIG. 1 taken along line 12-12, and illustrating the indentor guide assembly.
Figure 13:
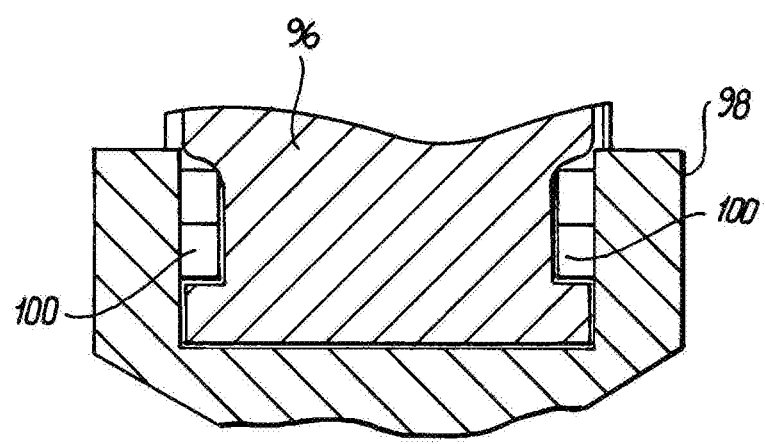
FIG. 13 is an enlarged view of the indentor guide assembly of the working head of FIG. 12.
Figure 14:
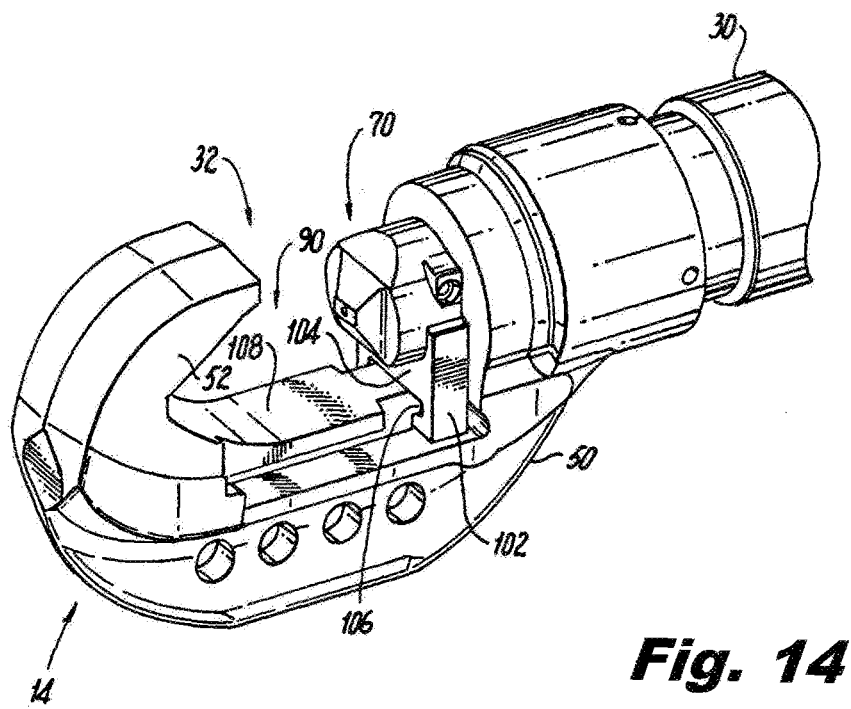
FIG. 14 is a top perspective view of another exemplary embodiment of a working head of the crimping tool of FIG. 1, illustrating a fixed nest for receiving an indentor coupled to another exemplary embodiment of an indentor guide assembly.
Figure 15:
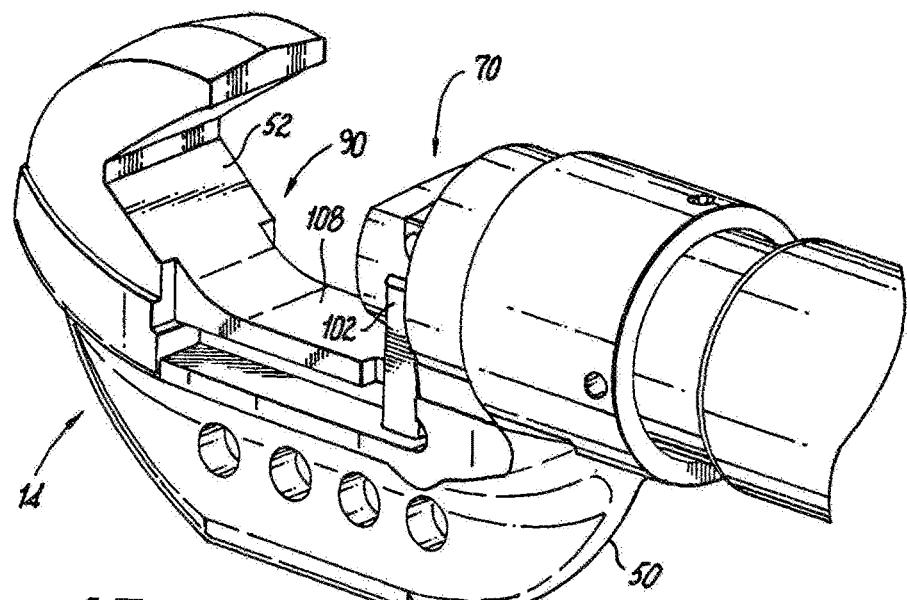
FIG. 15 is a rear perspective view of the working head of FIG. 14, illustrating the fixed nest and the indentor guide assembly.
Figure 16:
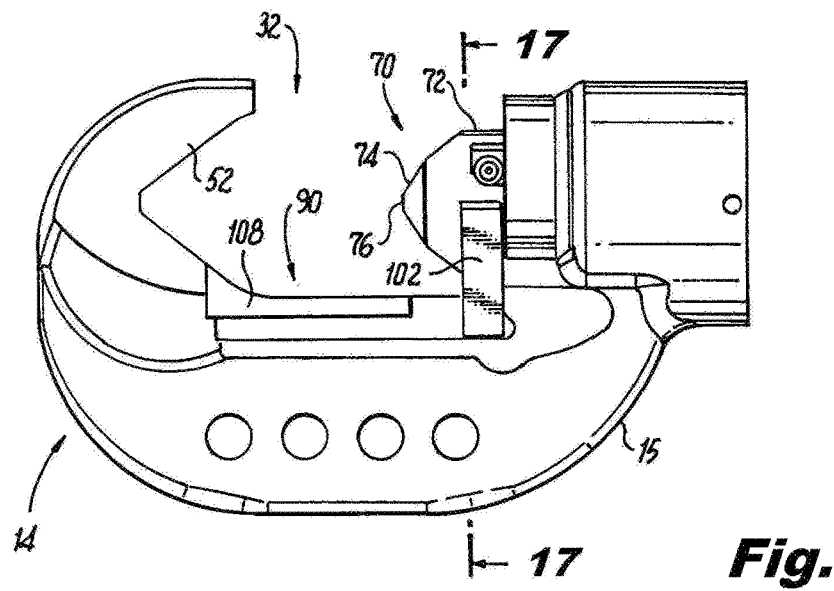
FIG. 16 is a side elevation view of the working head of FIG. 15.

Referring now to FIGS. 1, 12 and 13, an exemplary embodiment of an indentor guide assembly 90 is shown. In this exemplary embodiment, the indentor guide assembly 90 is an internal male/female T-track assembly. This T-track assembly includes a carriage 92 integrally formed to the indentor 70 or secured to the indentor, by for example a weld joint or set screw. The carriage 92 has a base 96 in the form of a T-shape that is intended to extend into a U-shaped guide 98 forming a portion of the head frame 50 within the working area 32 of the working head 14. The U-shaped guide 98 includes retainer arms 100 that maintain the base 96 within the U-shaped guide 98, as shown in FIGS. 12 and 13, so that the carriage 92 can move relative to the U-shaped guide 98. This T-track assembly 90 guides the carriage 92 and the indentor 70 as the indentor moves between the home position and the impacting position. The carriage 92 also helps to limit or prevent rotation of the indentor 70 relative to the piston 60.

Figure 17:
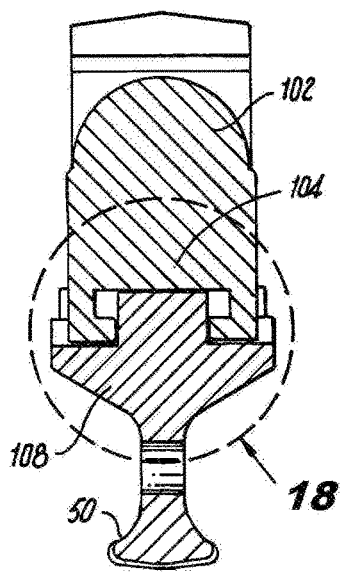
FIG. 17 is a cross-sectional view of the working head of FIG. 16 taken along line 17-17, and illustrating the indentor guide assembly.
Figure 18:
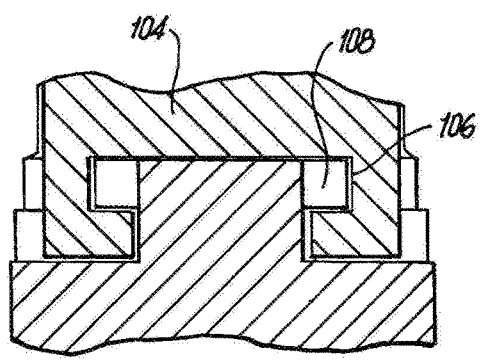
FIG. 18 is an enlarged view of the indentor guide assembly of the working head of FIG. 17.
Figure 19:
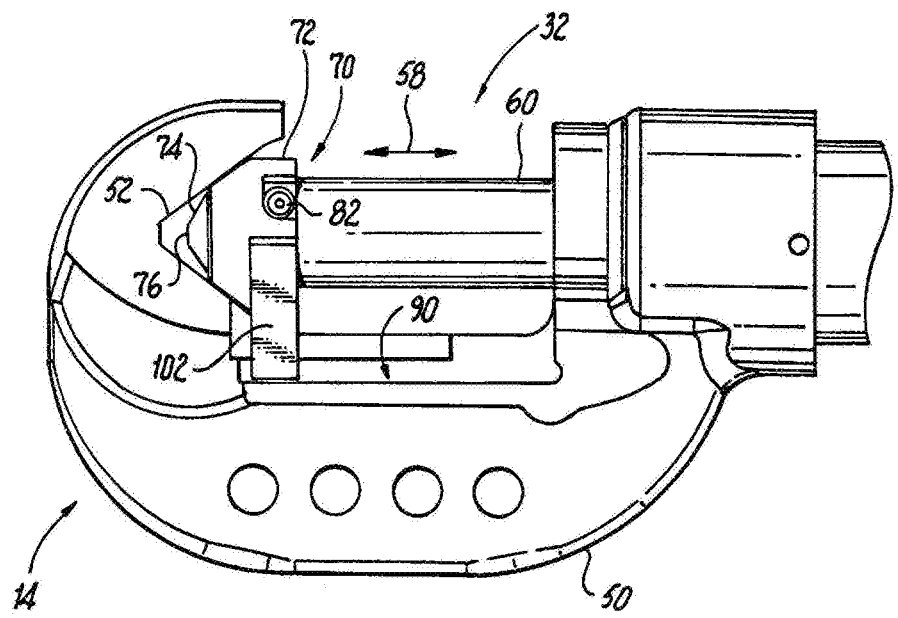
FIG. 19 is a side perspective view of the working head of FIG. 14, illustrating the indentor in an impacting position.

Referring to FIGS. 14-19, another exemplary embodiment of the indentor guide assembly 90 is shown. In this exemplary embodiment, the indentor guide assembly 90 is an external male/female T-track assembly. This T-track assembly includes a carriage 102 integrally formed to the indentor 70, or secured to the indentor, by for example a weld joint or set screw. The carriage 102 has a base 104 with a T-shaped channel 106 for receiving a T-shaped guide 108 forming a portion of the head frame 50 within the working area 32 of the working head 14. The T-shaped channel 106 in the base 104 and the T-shaped guide 108 maintain the base 104 within the T-shaped guide 108, as shown in FIGS. 17 and 18. The T-track assembly 90 guides the carriage 102 and the indentor 70 as the indentor moves between the home position and the impacting position, seen in FIG. 19. The carriage 102 also helps to limit or prevent rotation of the indentor 70 relative to the piston 60.

Figure 20:
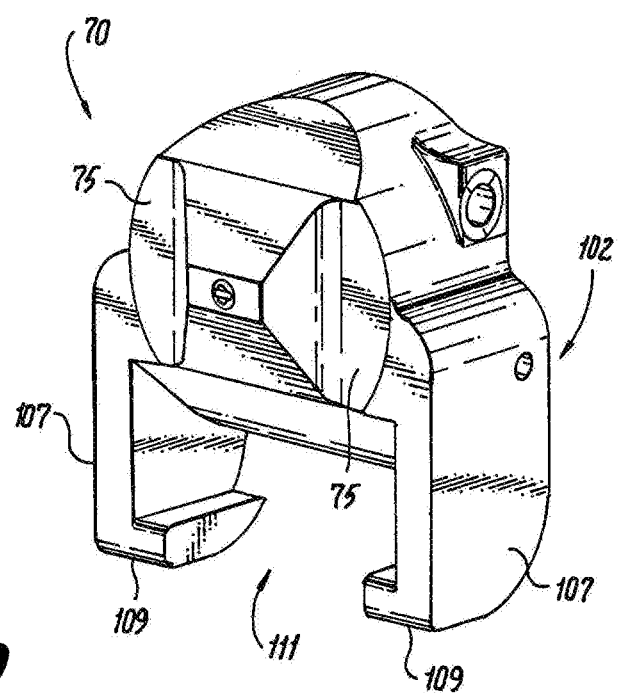
FIG. 20 is a front perspective view of another exemplary embodiment of an indentor and a carriage used in the crimping tool shown in FIG. 1.
Figure 21:
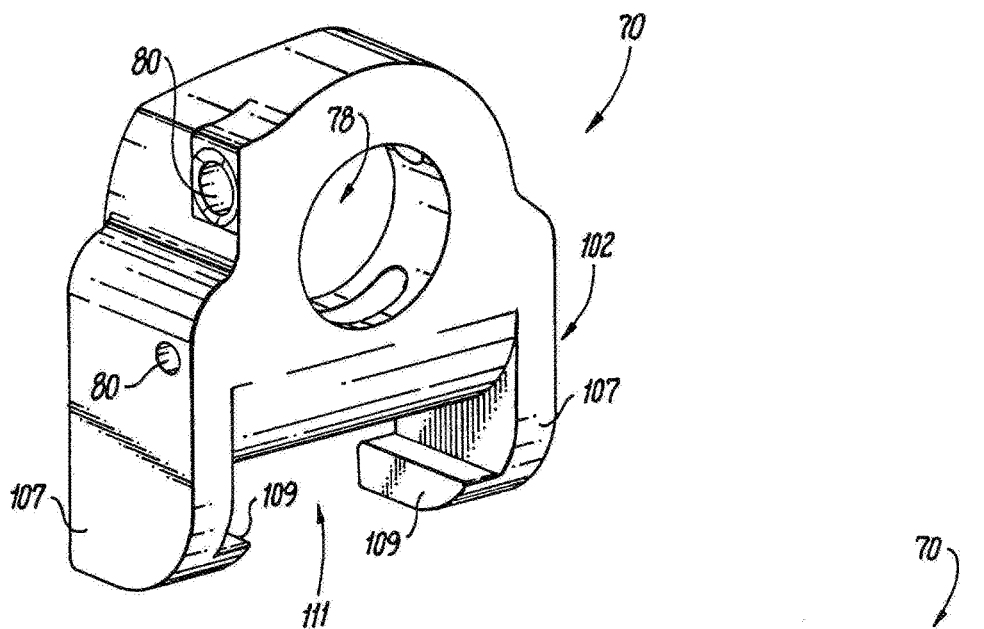
FIG. 21 is a rear perspective view of the indentor and a carriage of FIG. 20.
Figure 22:
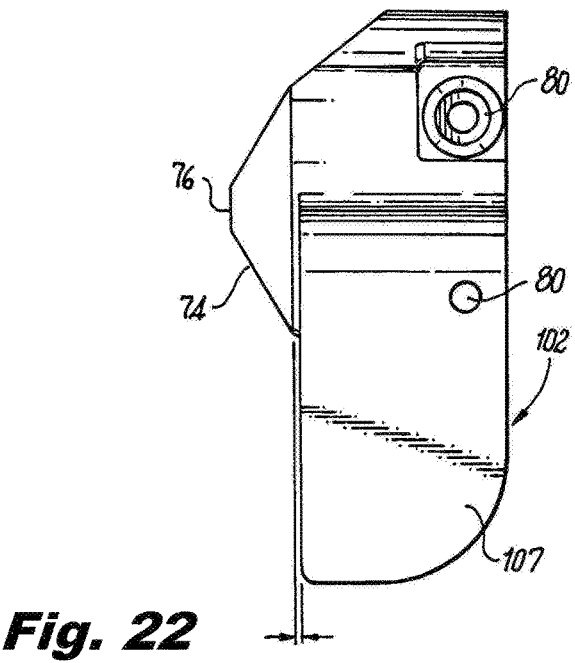
FIG. 22 is a side elevation view of the indentor and a carriage of FIG. 20.

FIGS. 20-22 provide another exemplary embodiment of the indentor 70 and the carriage 102. In this embodiment, the carriage 102 includes a pair of legs 107 secured to or integrally formed into the indentor 70. Each leg 107 has a track guide arm 109 that extends toward the opposite leg such that the legs 107 and track guide arm 109 form a T-shaped channel 111 for receiving the T-shaped guide 108 forming a portion of the head frame 50 within the working area 32 of the working head 14 as described above. The T-shaped channel 111 in the carriage 102 and the T-shaped guide 108 maintain the carriage 102 within the T-shaped guide 108. The T-track assembly 90 guides the carriage 102 and the indentor 70 as the indentor moves between the home position and the impacting position. The carriage 102 also helps to limit or prevent rotation of the indentor 70 relative to the piston 60. In addition, the surfaces 75 of the front face 74 of indentor 70 act as a stop to prevent the legs 107 from impacting a wire lug within the nest 52, which may cause stress on the legs and degrade their durability.

Referring to FIG. 23, another exemplary embodiment of the indentor guide assembly 90 is shown. In this embodiment, the indentor 70 has the same diameter as the piston 60 and is integrally formed into the distal end of the piston, or secured to the distal end of the piston. The indentor guide assembly 90 includes carriage 120 and collar 122. The carriage 120 can be integrally formed to the indentor 70, or the indentor 70 can be secured to the carriage 120 by, for example, a weld joint or screw. The collar 122 is integrally formed into the head frame 50, or is attached to the head frame. As the indentor 70 is moved from the home position to the impacting position, the carriage 120 moves along plate 124 of the head frame 50 maintaining the indentor on a substantially linear path toward the impacting position and limiting or preventing the indentor from flexing downward. The carriage 120 also helps to limit or prevent rotation of the indentor 70. As the indentor 70 is moved from the home position to the impacting position, the collar 122 limits or prevents the indentor 70 from flexing upward. Thus, the combination of the carriage 120 and the collar 122 maintains the vertical orientation of the indentor 70 as it moves between the home position and the impacting position.

Figure 25:
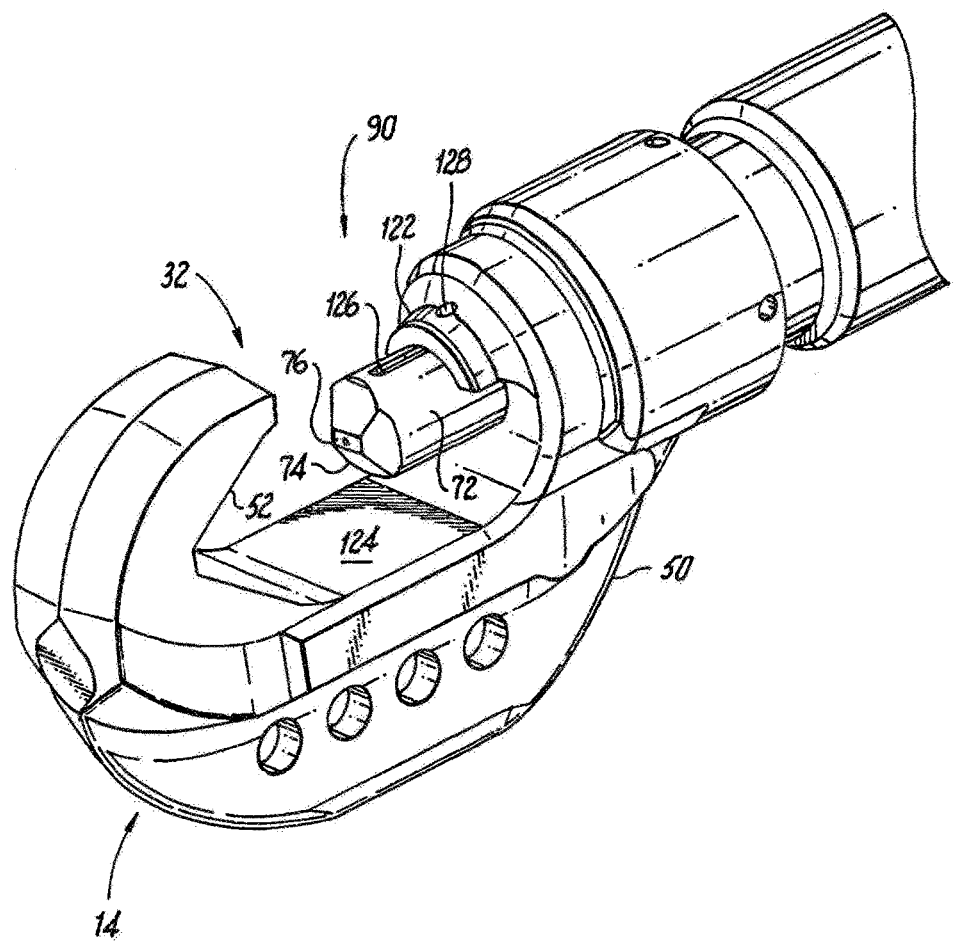
FIG. 25 is top perspective view of another exemplary embodiment of a working head of the crimping tool of FIG. 1 similar to FIG. 24 and including a set screw and an upper collar for guiding movement of the indentor.

Referring to FIGS. 24 and 25, another exemplary embodiment of the indentor guide assembly 90 is shown. In this embodiment, the indentor 70 has the same diameter as the piston 60, and is integrally formed into the distal end of the piston, or secured to the distal end of the piston. The indentor guide assembly 90 comprises collar 122, which is integrally formed into the head frame 50, or is attached to the head frame. As the indentor 70 is moved from the home position to the impacting position, the arched shape and the arc length of the collar 122 limit or prevent the indentor 70 from flexing as the indentor moves between the home position and the impacting position. To align the position of the impacting surface 76 of the indentor 70 and to limit or prevent rotation of the indentor, an alignment slot 126 may be provided in the indentor 70 and piston 60, and a set screw (not shown) may be inserted into aperture 128 in collar 122. When the set screw is inserted into the aperture 128 and into the alignment slot 126, the set screw acts as a guide for the indentor and limits or prevents rotation of the indentor.

Referring to FIGS. 26-31, another exemplary embodiment of a crimping tool according to the present disclosure is shown. The crimping tool 200 includes a tool frame 12 and a working head 210. The tool frame 12 is the same as the tool frame described above and for ease of description is not repeated. The working head 210 includes a head frame 212 and an indentor 230, which is the same as the indentor 70 described above. The head frame 212 may be connected to the front end of the tool frame 12 and fixed or locked in position. In another embodiment, the head frame 212 may be rotatably connected to the tool frame 12.

Figure 26:
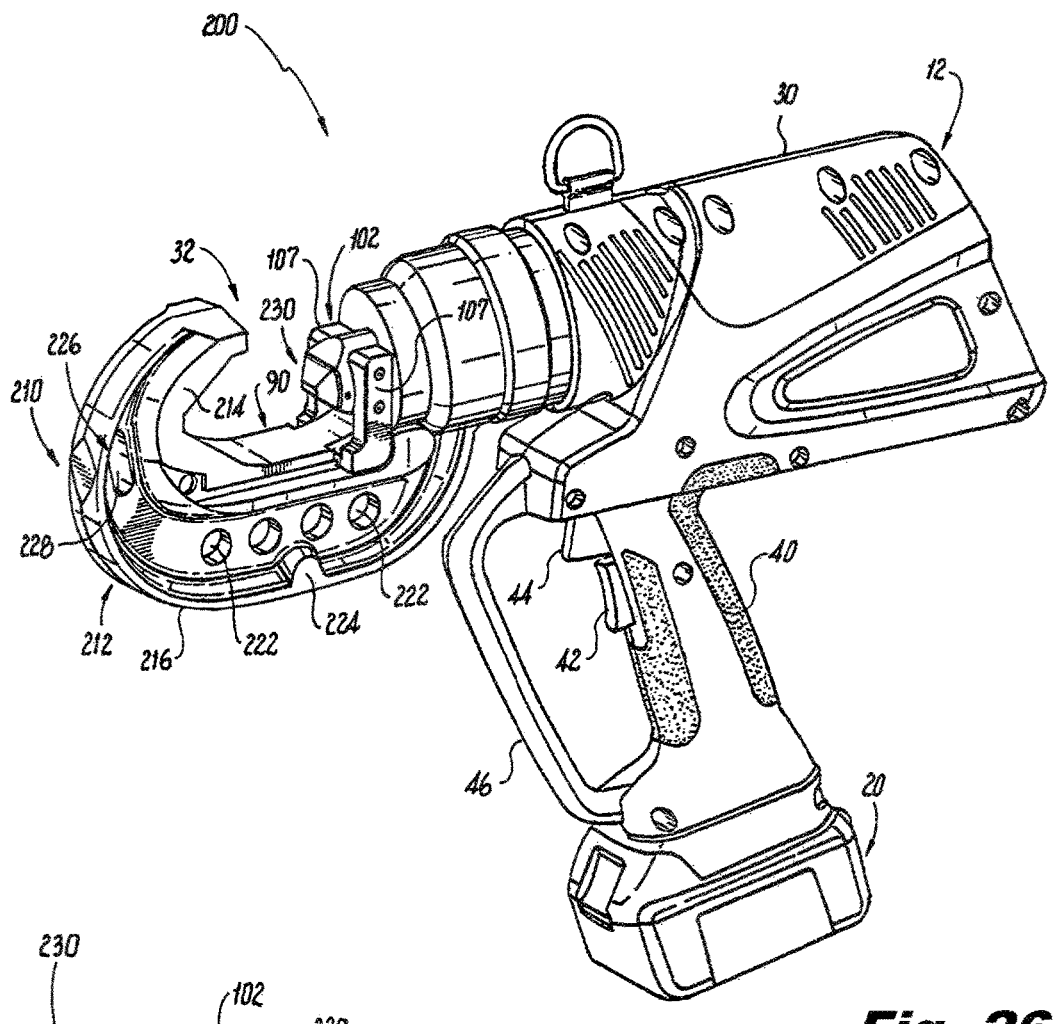
FIG. 26 is a top perspective view of another exemplary embodiment of a crimping tool according to the present disclosure, illustrating a tool frame and a working head having an I-beam construction.
Figure 26A:
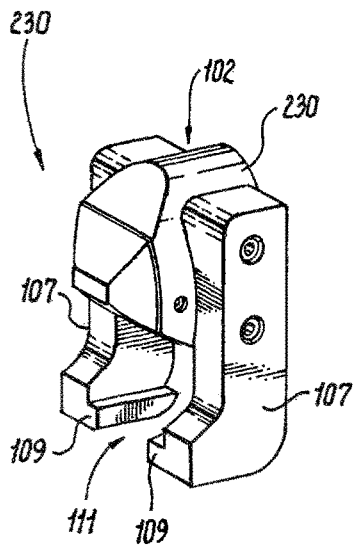
FIG. 26A is a top perspective view of an exemplary embodiment of an indentor according to the present disclosure included in the working head of FIG. 26.
Figure 27:
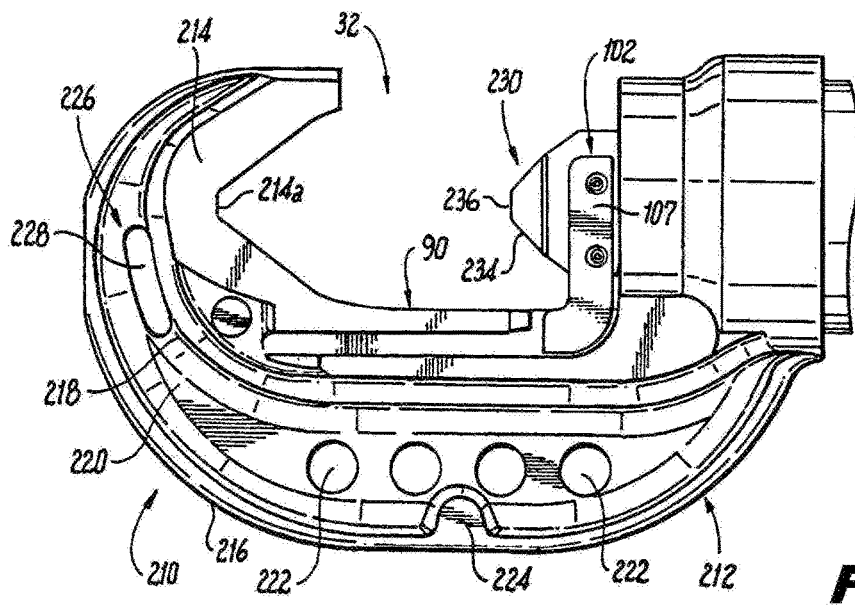
FIG. 27 is a side elevation view of the working head of FIG. 26, illustrating an indentor in a home position.
Figure 28:
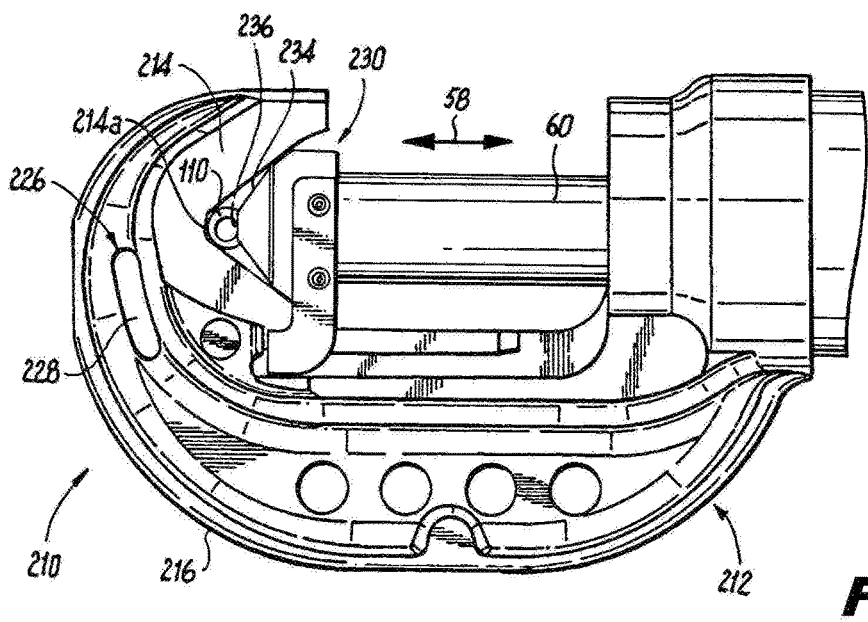
FIG. 28 is a side elevation view of the working head FIG. 27, illustrating the indentor in an impacting position.
Figure 29:
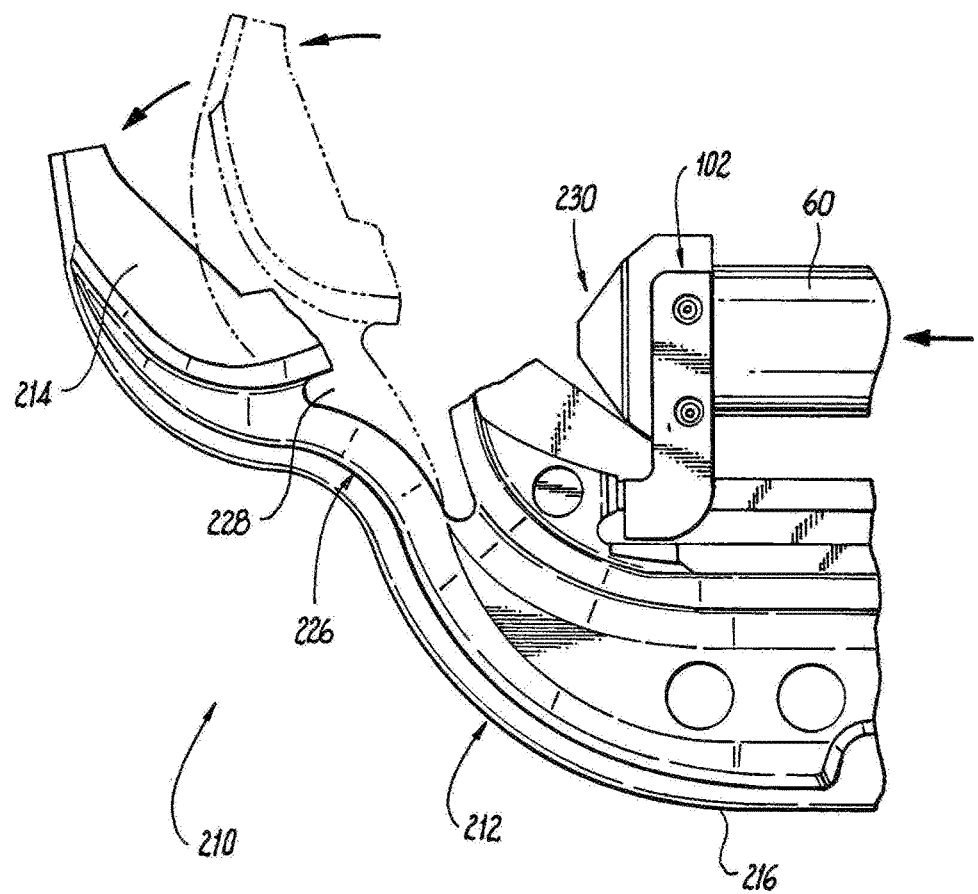
FIG. 29 is an enlarged side elevation view of a portion of the working head of FIG. 26, illustrating an exemplary embodiment of a break-away region that permits the working head to absorb a failure of the nest when the indentor is in the impacting position.

Referring to FIGS. 26-28, the head frame 212 of the working head 210 includes a nest 214 that is configured to receive a wire lug 110 for subsequent crimping by the indentor 230. The nest 214 can come in any number of embodiments. For example, in the exemplary embodiment shown the nest 214 is a V-nest. The shape of the nest is preferably matched to the shape of the indentor 230 so that the indentor is not generally prohibited from impacting a wire lug 110 resting within the nest 214. Typically, this is not an issue with larger wire lugs that occupy a larger area within the nest 214 such that the indentor may not contact the nest 214. However, there may be instances where the wire lug is sufficiently small so that a front face 234 of the indentor 230 contacts one or more walls of the nest 214. In such instances it may be desirable to have the front face 234 of the indentor 230 contact one or more walls of the nest 214 as a way to minimize the force applied to the crimping of small wire lugs. In such cases, the walls of the nest 214 would absorb a portion of the force exerted by the indentor 230, and the remaining force would be used by an impacting surface 236 of the indentor to crimp a wire into the wire lug. In addition, the piston 60 used to move the indentor 230 between the home position and the impacting position may include a stop, similar to stop 61 seen in FIG. 3A, that contacts the head frame 212 to further limit the force applied by the indentor 230 when in the impacting position.

Figure 30:
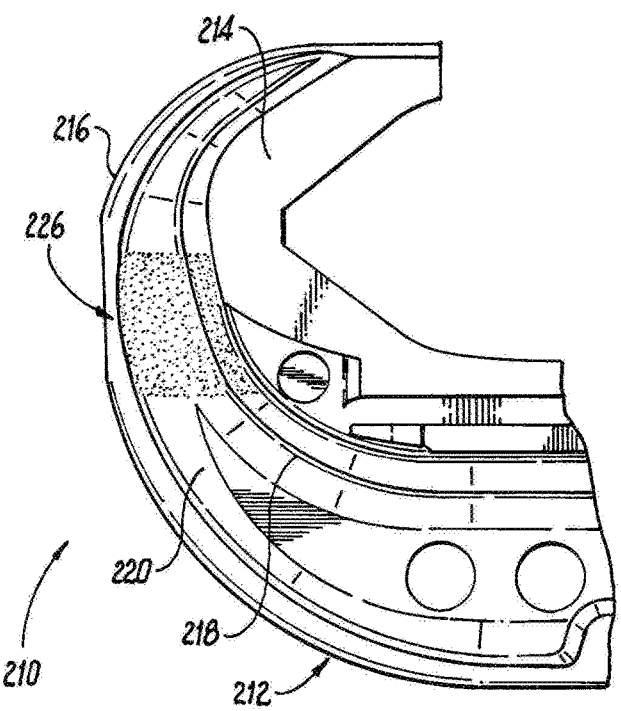
FIG. 30 is an enlarged side elevation view of a portion of another exemplary embodiment of the working head of FIG. 26, illustrating another exemplary embodiment of a break-away region that permits the working head to absorb a failure of the nest when the indentor is in the impacting position.
Figure 31:
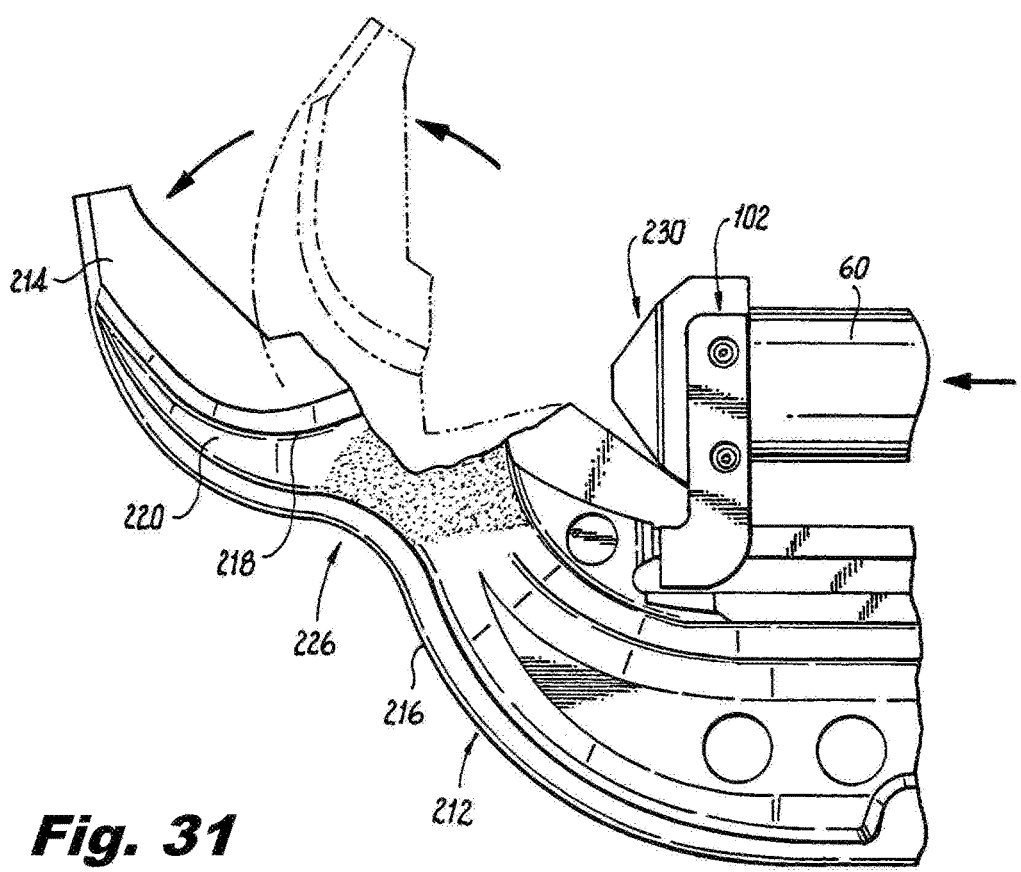
FIG. 31 is a side elevation view of the portion of the working head shown in FIG. 30, illustrating the indentor is in the impacting position and the break-away region absorbing a nest failure.

Between the nest 214 and the outer periphery of the head frame 212 and between the indentor guide assembly 90 and the outer periphery of the head frame 212 is an I-beam like structure with a lower flange 216, an upper flange 218 and a web 220 between the flanges. The web 220 may include one or more openings 222 provided to reduce the weight of the head frame 212. The lower flange 216 may include one or more bosses 224 provided to increase the load capacity that the head frame can withstand. The web 220 may also include a break-away region 226. In the embodiment shown in FIGS. 27-29, the break-away region 226 includes an opening, such as slot 228, that is aligned with a base portion 214a of the nest 214 as shown. The break-away region is provided as a fail-safe mechanism such that in the event the nest 214 were to fail when the indentor is in the impacting position, the failure would be directed toward the break-away region 226, here opening 228, so that a portion of the lower flange 216 and associated portions of the web 220 would bend outwardly away from the working area 32 of the working head 210, as shown by the arrows in FIG. 29. This bending of the lower flange 216 and the web 220 absorbs the nest failure while maintaining a connection between the portion of the nest that failed and the head frame 212. In the embodiment of FIGS. 30 and 31, the break-away region 226 is formed by annealing a portion of the head frame 212. By annealing the metal head frame, the physical and possibly chemical properties of the metal are altered to increase the plastically, e.g., ductility and/or malleability, of the metal to reduce its hardness and allowing the metal to deform under stress, e.g., tensile stress or compression stress, without fracturing. Similar to the embodiment of FIG. 29, the break-away region is provided as a fail-safe mechanism such that in the event the nest 214 were to fail when the indentor is in the impacting position, the failure would be directed toward the break-away region 226 so that a portion of the lower flange 216 and associated portions of the web 220 would bend outwardly away from the working area 32 of the working head 210, as shown by the arrows in FIGS. 30 and 31. This bending of the lower flange 216 and the web 220 absorbs the nest failure while maintaining a connection between the portion of the nest that failed and the head frame 212.

Referring again to FIGS. 26-28, in the exemplary embodiment shown, the indentor 230 is releasably coupled to the piston 60 as described above. The hydraulic drive conduit system 28, including the piston 60, is connected between the pump 16 and the body of the indentor 230. Hydraulic fluid, which is in the fluid reservoir 22, is pumped by the pump 16 through the hydraulic drive conduit system 28 and against a proximal end of the piston 60 causing the indentor 230 to move. As described above and indicated by arrow 58, the piston 60, when activated, moves the indentor 230 between the impacting position where the indentor impacts a wire lug, as seen in FIG. 28, and the home position where the piston is retracted towards the tool frame 12, as seen in FIG. 27.

The indentor guide assembly 90 shown in this exemplary embodiment is similar to the external male/female T-track assembly described above with reference to FIGS. 14-19. In this embodiment, the T-track assembly includes a carriage 102 that includes a pair of legs 107 that can be integrally formed to the indentor 230 or secured to the indentor, by for example a weld joint or set screw. Each leg 107 has a track guide arm 109 that extends toward the opposite leg such that the legs 107 and track guide arms 109 form a T-shaped channel 111 for receiving the T-shaped guide 108 forming a portion of the head frame 212 within the working area 32 of the working head 210 as described above. The T-shaped channel 111 in the carriage 102 and the T-shaped guide 108 maintain the carriage 102 within the T-shaped guide 108. The T-track assembly 90 guides the carriage 102 and the indentor 230 as the indentor moves between the home position and the impacting position. The carriage 102 also helps to limit or prevent rotation of the indentor 230 relative to the piston 60.

Figure 32:
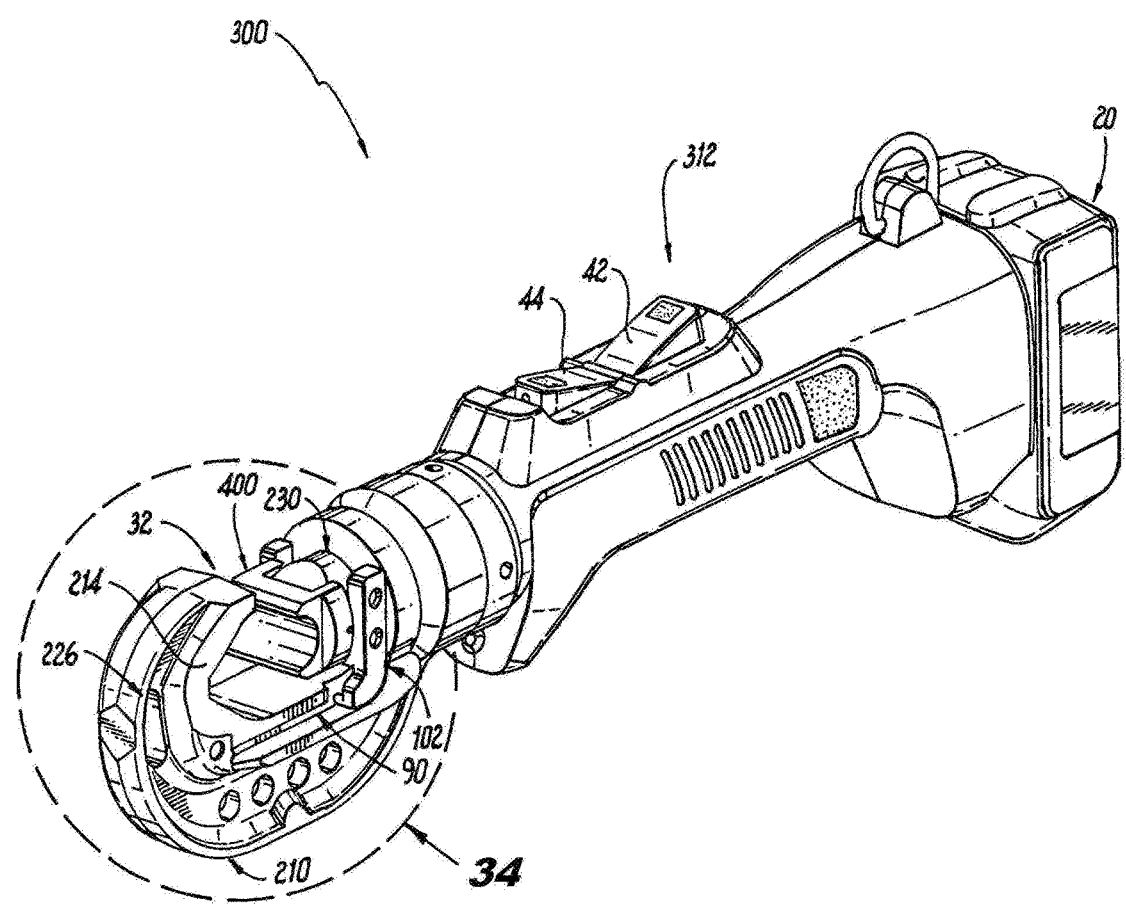
FIG. 32 is a top perspective view of another exemplary embodiment of a crimping tool according to the present disclosure, illustrating an in-line type tool frame and a working head having an I-beam construction.

Referring to FIG. 32, another exemplary embodiment of a crimping tool according to the present disclosure is shown. The crimping tool 300 includes a tool frame 312 having an in-line shape, and a working head similar to working head 210 described above. Within the in-line frame 312 is the pump 16, motor 18, fluid reservoir 22, controller 24 and a hydraulic drive conduit system 28 described above. Battery 20 can be releasably coupled or fixed to the in-line tool frame 312 as described above. The crimping tool 300 may also include a camera 26, seen in block form in FIG. 5, mounted to the tool frame 312 and oriented to provide a video of a working area 32 of the working head 210. The crimping tool 300 may also include a tool tracking system 27, seen in block form in FIG. 5, for tracking the location of the tool as described above.

Figure 33:
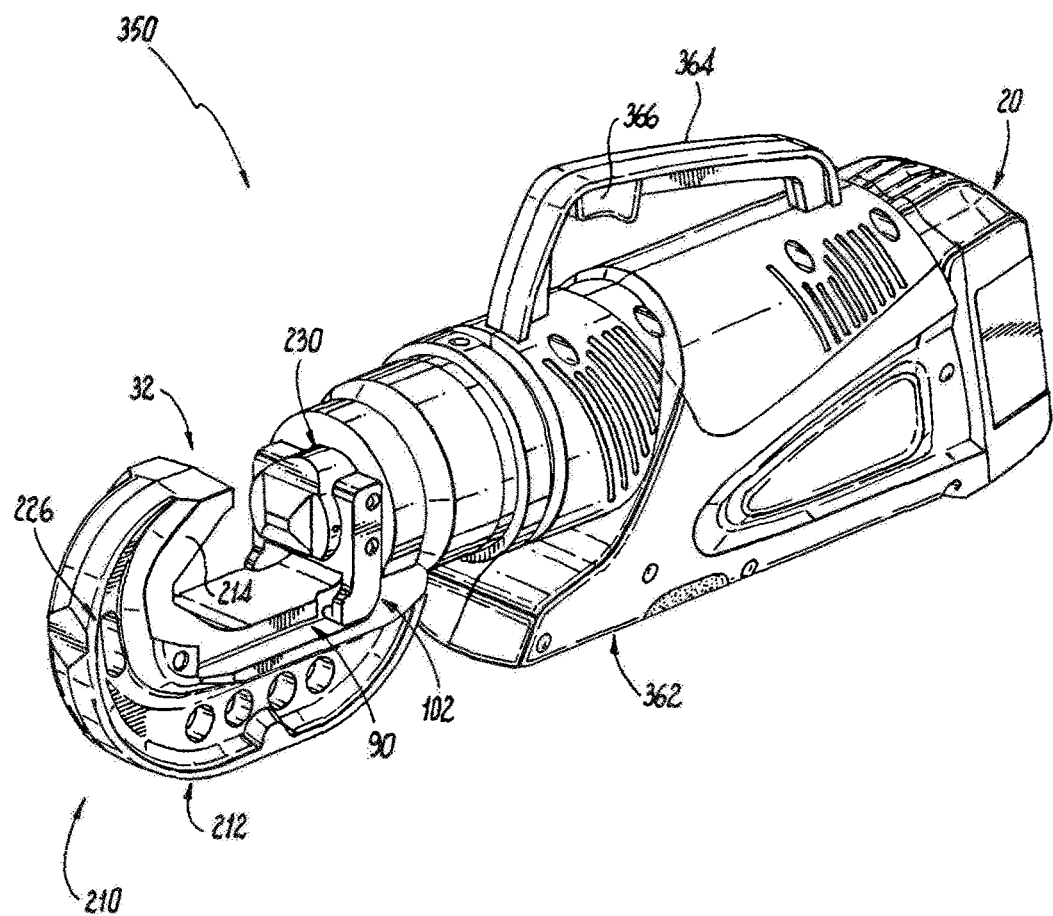
FIG. 33 is a top perspective view of another exemplary embodiment of a crimping tool according to the present disclosure, illustrating a suitcase type tool frame and a working head having an I-beam construction.

Referring to FIG. 33, another exemplary embodiment of a crimping tool according to the present disclosure is shown. The crimping tool 350 includes a tool frame 362 having a suitcase shape, and a working head similar to working head 210 described above. Within the suitcase frame 362 is the pump 16, motor 18, fluid reservoir 22, controller 24 and a hydraulic drive conduit system 28 described above. Battery 20 can be releasably coupled or fixed to the suitcase frame as described above. The suitcase frame 362 includes a carry handle 364 and one or more trigger switches 366 that can activate the piston to move the indentor 230 to the impacting position and to deactivate the indentor 230 so that the piston and indentor move to the home position. The crimping tool 350 may also include a camera 26, seen in block form in FIG. 5, mounted to the tool frame 362 and oriented to provide a video of a working area 32 of the working head 210. The crimping tool 350 may also include a tool tracking system 27, seen in block form in FIG. 5, for tracking the location of the tool as described above.

Figure 34:
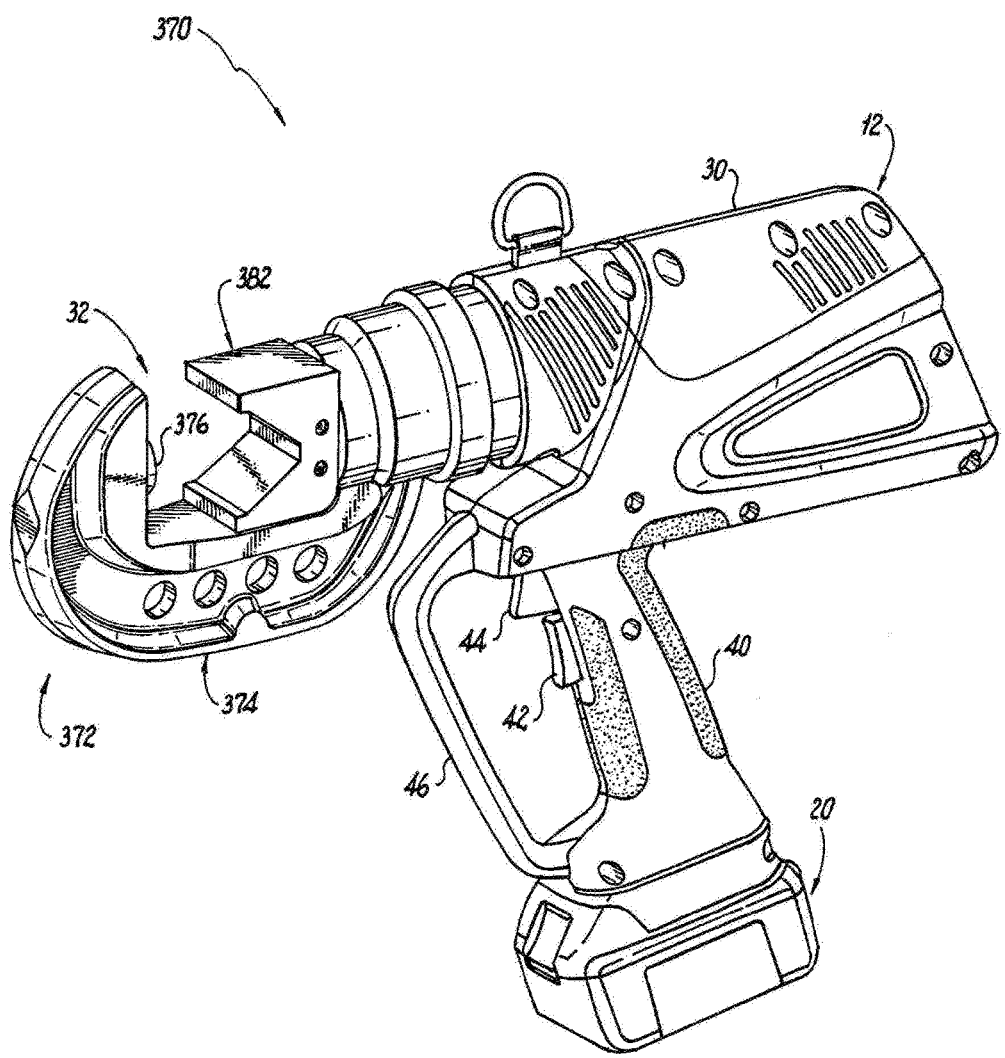
FIG. 34 is a top front perspective view of another exemplary embodiment of a crimping tool according to the present disclosure, illustrating a pistol grip type tool frame and a working head having an I-beam construction and a movable nest and fixed indentor.
Figure 35:
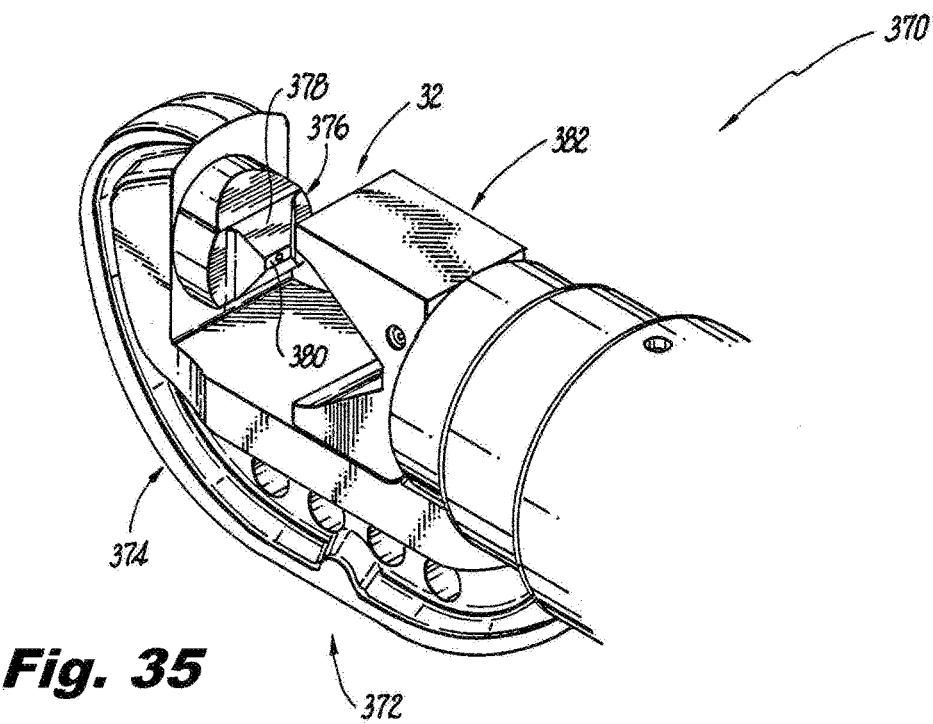
FIG. 35 is a top rear perspective view of another exemplary embodiment of a crimping tool according to the present disclosure, illustrating a pistol grip type tool frame and a working head having an I-beam construction and a movable nest and fixed indentor.
Figure 36:
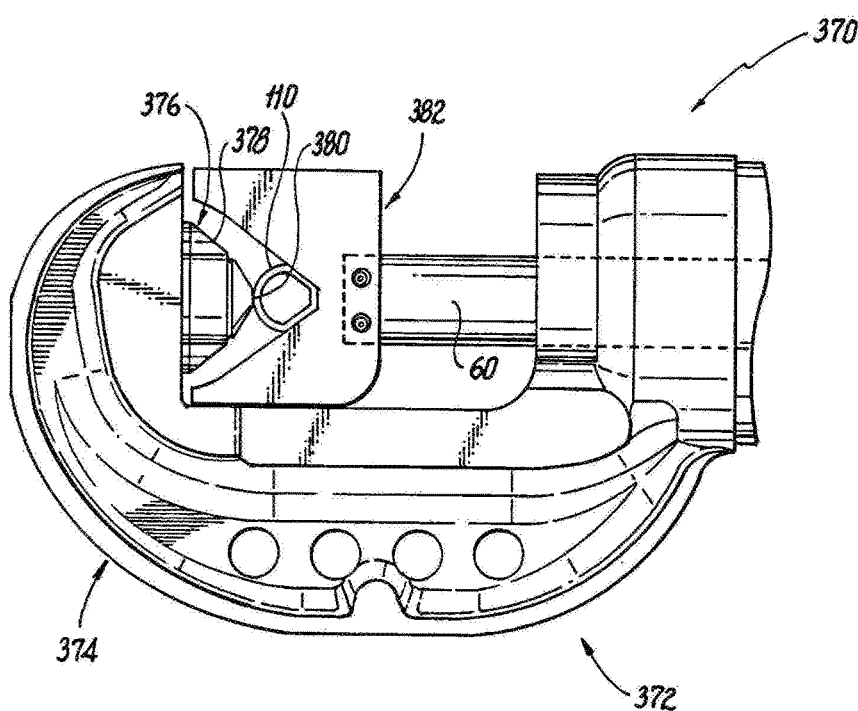
FIG. 36 is a side elevation view of the working head shown in FIG. 34.

Referring to FIGS. 34-36, another exemplary embodiment of a crimping tool according to the present disclosure is shown. The crimping tool 370 includes a tool frame 12 and a working head 372. The tool frame 12 is the same as the tool frame described above and for ease of description is not repeated. The working head 372 includes a head frame 374, an indentor 376, which is substantially the same as the indentor 70 described above, and a nest 382. The head frame 374 may be connected to the front end of the tool frame 12 and fixed or locked in position. In another embodiment, the head frame 374 may be rotatably connected to the tool frame 12.

In this embodiment, the indentor 376 is attached to the distal end of the head frame 374 in the working area 32, as shown. The indentor 376 may be secured to the head frame 374 by for example a welded joint, integrally formed into the head frame or the indentor may be releasably attached to the head frame using for example set screws. The nest 382 is secured to the piston 60 in a similar manner as the embodiments above where the indentor is secured to the piston. The nest 382 is movable between the home position, seen in FIG. 34, and the impacting position, seen in FIG. 36. More specifically, the hydraulic drive conduit system 28, including the piston 60, is connected between the pump 16 and the body of the nest 382. Hydraulic fluid, which is in the fluid reservoir 22, is pumped by the pump 16 through the hydraulic drive conduit system 28 and against a proximal end of the piston 60 causing the nest 382 to move. The piston 60, when activated, moves the nest 382 between the impacting position where the indentor 376 impacts a wire lug, as seen in FIG. 36, and the home position where the piston is retracted towards the tool frame 12, as seen in FIG. 35.

The nest 382 is configured to receive a wire lug 110 for subsequent crimping by the indentor 376. The nest 382 can come in any number of embodiments. For example, in the exemplary embodiment shown the nest 382 is a V-nest. The shape of the nest is preferably matched to the shape of the indentor 376 so that the indentor is not generally prohibited from impacting a wire lug 110 resting within the nest 382. Typically, this is not an issue with larger wire lugs that occupy a larger area within the nest 382 such that the indentor 376 may not contact the nest 382. However, there may be instances where the wire lug is sufficiently small so that a front face 378 of the indentor 376 contacts one or more walls of the nest 382. In such instances, it may be desirable to have the front face 378 of the indentor 376 contact one or more walls of the nest 382 as a way to minimize the force applied to the crimping of small wire lugs. In such cases, the walls of the nest 382 would absorb a portion of the force exerted by the indentor 376, and the remaining force would be used by an impacting surface 380 of the indentor to crimp a wire into the wire lug.

Figure 37:
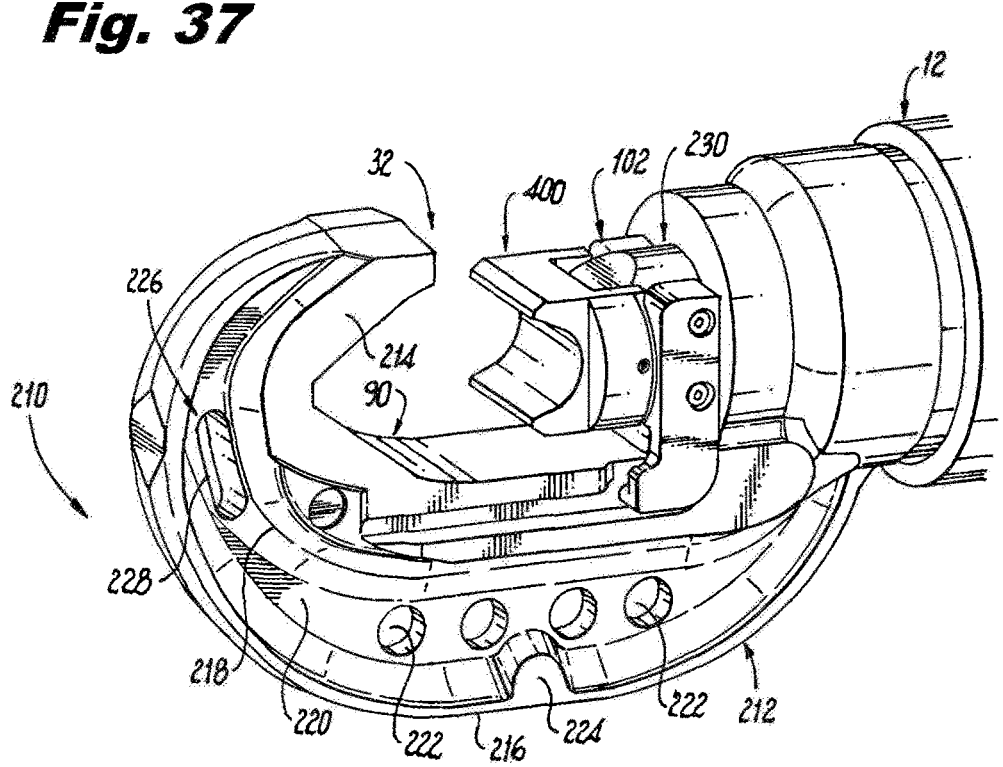
FIG. 37 is a side perspective view of the working head of FIG. 26, illustrating the indentor in a home position and an adapter attached to the indentor.
Figure 38:
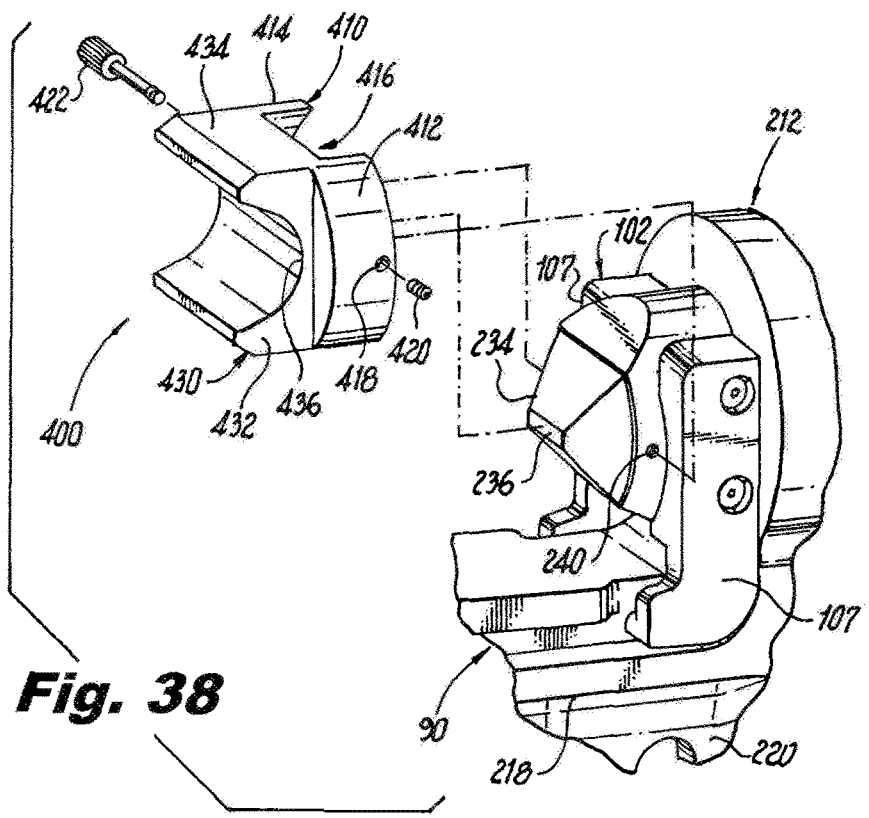
FIG. 38 is an enlarged perspective view with parts separated of the indentor and adapter of FIG. 37.
Figure 39:
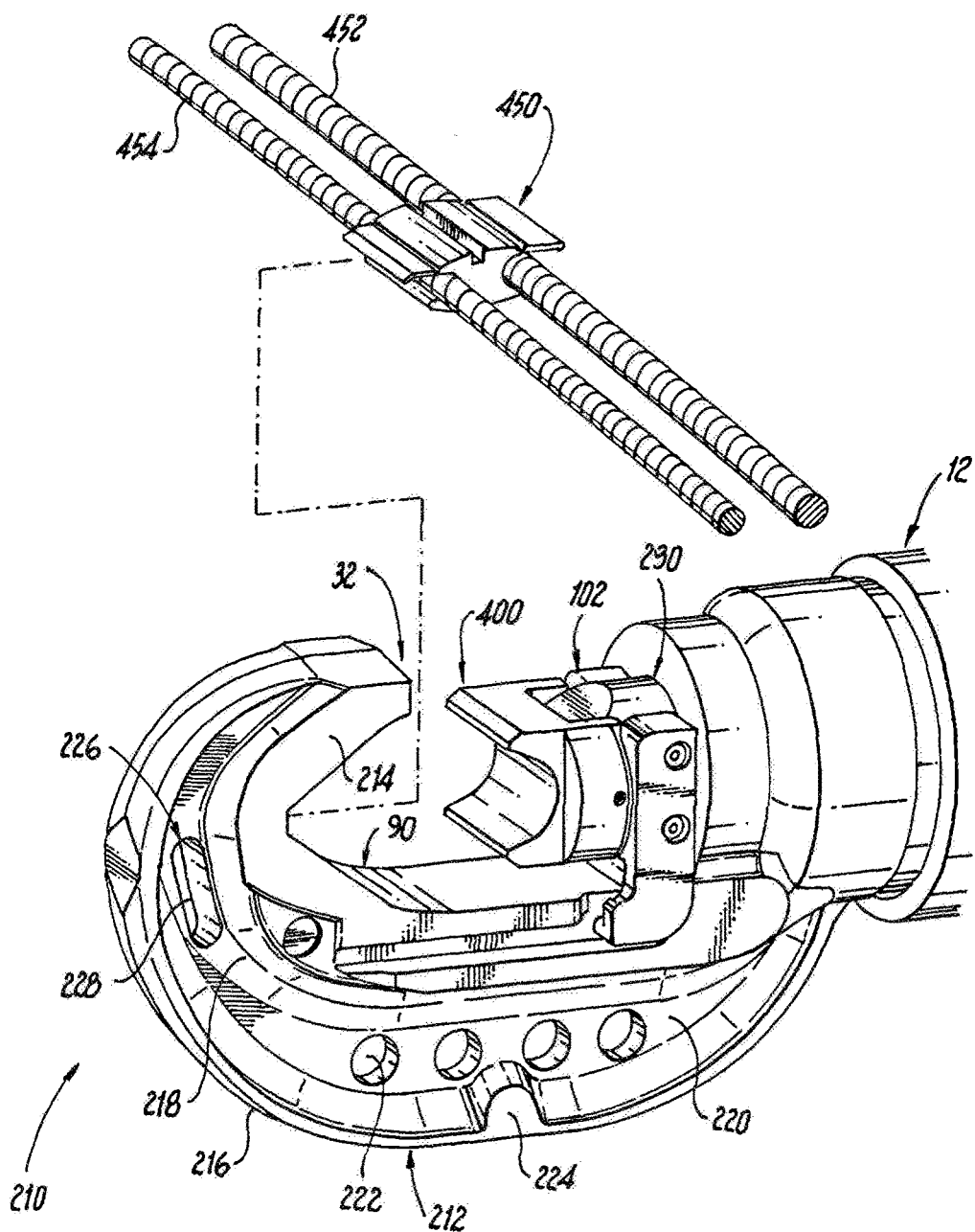
FIG. 39 is the side perspective view of FIG. 37, an H-frame crimp and electrical conductors positioned for insertion into the working head for crimping.

Turning now to FIGS. 37-39, an exemplary embodiment of an adaptor that can be mounted to the indentor is described. The adapter 400 releasably attaches to the indentor 230 and is provided to permit the crimping tool to crimp differently shaped crimping members. In the embodiment shown, the adapter 400 includes a base portion 410 and an impacting portion 430. The base portion 410 releasable connects to the indentor 230 and the impacting portion 430 impacts the crimping member. The base portion 410 includes a pair of legs 412 and 414 extending from the impacting portion, as shown in FIG. 38, and an indentor receiving channel 416 between the legs. Leg 412 has an aperture 418 that receives a locating pin 420. The aperture 418 may be a threaded aperture that receives a threaded locating pin or the aperture may be a smooth bore that receives a dowel like locating pin. Leg 414 has an aperture (similar to aperture 418) that receives a locking pin 422. The aperture may be a threaded aperture that receives a threaded locking pin or the aperture may be a smooth bore that receives a dowel like locking pin. In the embodiment shown, the locating pin 420 is a set screw and the locking pin 422 has a threaded distal end. The indentor receiving channel 416 is configured and dimensioned to receive the front face 234 and impacting surface 236 of the indentor 230, as shown in FIG. 37. The impacting portion 430 in this exemplary embodiment is a U-shaped member having side walls 432 and 434 and a bottom wall 436 connected between the side walls. The U-shaped member forming the impacting portion 430 is shaped to crimp H-frame type crimping members, such as the HYCRIMP and the LOKTAP crimps manufactured by Burndy LLC.

To mount the adapter 400 to the indentor 230, the adapter is positioned over the indentor and the locating pin 420, which may be extending into the indentor receiving channel 416, is positioned in a first aperture 240 in the side of the indentor 230 shown in FIG. 38. The aperture 240 may be threaded or smooth depending upon the type of locating pin used. With the locating pin in the aperture 240, the locking pin can then be inserted into a second aperture in the opposite side of the indentor 230. The second aperture may be threaded or smooth depending upon the type of locking pin used. With the adapter 400 releasably secured to the indentor 230, an H-frame crimp 450 having conductors 452 and 454, seen in FIG. 36, can be inserted in the nest 214 of the working head 210 and the crimping tool can be activated such that the adapter 400 is moved toward the impacting position to crimp the conductors to the H-frame crimp 450.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A dieless crimping tool comprising:
   a working head having a head frame, a movable indentor having a body, a front face extending from the body and an impact surface extending from the front face, and an indentor guide assembly, wherein the head frame has open access to a working area of the working head and a nest having a base portion and at least a pair of side walls extending from the base portion monolithically formed into the head frame and within the working area for receiving a crimping member;
   a tool frame having a piston coupled to the indentor that moves the indentor along the indentor guide assembly between a home position adjacent the tool frame and an impacting position adjacent the nest; and
   wherein a geometry of the nest substantially aligns with a geometry of the indentor such that the base portion of the nest aligns with the impacting surface of the indentor and the at least a pair of side walls of the nest align with the body of the indentor when the indentor is in the impacting position permitting the nest to receive crimping members of various sizes and align the received crimping member for impacting by the impacting surface of the indentor.

2. The dieless crimping tool according to claim 1, wherein the nest comprises a V-shaped nest.

3. The dieless crimping tool according to claim 1, wherein the indentor guide assembly comprises an internal T-track assembly.

4. The dieless crimping tool according to claim 1, wherein the indentor guide assembly comprises an external T-track assembly.

5. The dieless crimping tool according to claim 1, wherein the indentor is releasably coupled to the piston.

6. The dieless crimping tool according to claim 1, wherein the indentor is integrally formed into the piston.

7. The dieless crimping tool according to claim 1, wherein the head frame comprises a C-shaped head frame having the open access to the working area of the working head.

8. The dieless crimping tool according to claim 1, wherein when the piston is coupled to the indentor the piston is capable of rotating independent of the indentor.

9. The dieless crimping tool according to claim 1, wherein the head frame has an I-beam structure comprising an upper flange adjacent the nest and the indentor guide assembly, a lower flange and a web between the upper flange and the lower flange.

10. The dieless crimping tool according to claim 9, wherein the web includes a break-away region positioned adjacent the nest.

11. The dieless crimping tool according to claim 10, wherein the break-away region comprises an opening in the web.

12. The dieless crimping tool according to claim 11, wherein the opening in the web comprises a slot.

13. The dieless crimping tool according to claim 10, wherein the break-away portion comprises an annealed region of the head frame.

14. The dieless crimping tool according to claim 1, wherein the tool frame is shaped as a pistol grip type frame.

15. The dieless crimping tool according to claim 1, wherein the tool frame is shaped as an in-line type frame.

16. A dieless crimping tool comprising:
    a working head comprising:
        an indentor having a body, a front face extending from the body and an impacting surface extending from the front face;
        a head frame having I-beam structure comprising an upper flange, a lower flange and a web between the upper flange and the lower flange, an open access in the I-beam structure to a working area of the working head, a nest having a base portion and at least a pair of side walls extending from the base portion monolithically formed into the head frame and within the working area for receiving a crimping member, wherein the nest is adjacent at least a portion of the upper flange; and
        an indentor guide assembly positioned within the working area of the working head adjacent at least a portion of the upper flange;
    a tool frame having a piston coupled to the indentor that moves the indentor along the indentor guide assembly within the working area of the working head between a home position adjacent the tool frame and an impacting position adjacent the nest; and
    wherein a geometry of the nest substantially aligns with a geometry of the indentor such that the base portion of the nest aligns with the impacting surface of the indentor and the at least a pair of side walls of the nest align with the body of the indentor when the indentor is in the impacting position permitting the nest to receive crimping members of various sizes and align the received crimping member for impacting by the impacting surface of the indentor.

17. The dieless crimping tool according to claim 16, wherein the nest comprises a V-shaped nest.

18. The dieless crimping tool according to claim 16, wherein the indentor guide assembly comprises an internal T-track assembly.

19. The dieless crimping tool according to claim 16, wherein the indentor guide assembly comprises an external T-track assembly.

20. The dieless crimping tool according to claim 16, wherein the indentor is releasably coupled to the piston.

21. The dieless crimping tool according to claim 16, wherein the indentor is integrally formed into the piston.

22. The dieless crimping tool according to claim 16, wherein when the piston is coupled to the indentor the piston is capable of rotating independent of the indentor.

23. The dieless crimping tool according to claim 16, wherein the web includes a break-away region positioned adjacent the nest.

24. The dieless crimping tool according to claim 23, wherein the break-away region comprises an opening in the web.

25. The dieless crimping tool according to claim 24, wherein the opening in the web comprises a slot.

26. The dieless crimping tool according to claim 23, wherein the break-away region comprises an annealed region of the head frame.

27. The dieless crimping tool according to claim 16, wherein the tool frame is shaped as a pistol grip type frame.

28. The dieless crimping tool according to claim 16, wherein the tool frame is shaped as an in-line type frame.

29. A dieless crimping tool comprising:
    a working head having a head frame, an indentor having a body, a front face extending from the body and an impacting surface extending from the front face, and a nest having a base portion and at least a pair of side walls extending from the base portion, wherein the head frame has open access to a working area of the working head and the nest is monolithically formed into the head frame and within the working area for receiving a crimping member;

a tool frame having a piston coupled to the nest that moves the nest within the working area between a home position adjacent the tool frame and an impacting position adjacent the indentor; and wherein a geometry of the nest substantially aligns with a geometry of the indentor such that the base portion of the nest aligns with the impacting surface of the indentor and the at least a pair of side walls of the nest align with the body of the indentor when the indentor is in the impacting position permitting the nest to receive crimping members of various sizes and align the received crimping member for impacting by the impacting surface of the indentor.

30. The dieless crimping tool according to claim 29, wherein the nest comprises a V-shaped nest.

31. The dieless crimping tool according to claim 29, wherein the indentor is releasably secured to the head frame.

32. The dieless crimping tool according to claim 29, wherein the indentor is integrally formed into the head frame.

33. The dieless crimping tool according to claim 29, wherein the head frame comprises a C-shaped head frame having the open access to the working area of the working head.

34. The dieless crimping tool according to claim 29, wherein when the piston is coupled to the nest the piston is capable of rotating independent of the nest.

35. The dieless crimping tool according to claim 29, wherein the head frame has an I-beam structure comprising an upper flange, a lower flange and a web between the upper flange and the lower flange.

36. The dieless crimping tool according to claim 29, wherein the tool frame is shaped as a pistol grip type frame.

37. The dieless crimping tool according to claim 29, wherein the tool frame is shaped as an in-line type frame.

* * * * *